US012717291B2

(12) United States Patent
Kanamura et al.

(10) Patent No.: US 12,717,291 B2
(45) Date of Patent: Aug. 25, 2026

(54) APPARATUS CONTROL DEVICE, APPARATUS CONTROL METHOD, AND RECORDING MEDIUM

(71) Applicant: CASIO COMPUTER CO., LTD., Tokyo (JP)

(72) Inventors: Toshiaki Kanamura, Ome (JP); Atsushi Shibutani, Tokorozawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 543 days.

(21) Appl. No.: 18/113,001

(22) Filed: Feb. 22, 2023

(65) Prior Publication Data

US 2023/0305504 A1 Sep. 28, 2023

(30) Foreign Application Priority Data

Mar. 24, 2022 (JP) ................................ 2022-047794

(51) Int. Cl.

*G05B 15/02* (2006.01)
*G06N 3/008* (2023.01)
*A63H 13/00* (2006.01)

(52) U.S. Cl.

CPC ............ *G05B 15/02* (2013.01); *G06N 3/008* (2013.01); *A63H 13/005* (2013.01); *A63H 2200/00* (2013.01)

(58) Field of Classification Search

CPC ...... G05B 15/02; G06N 3/008; A63H 13/005; A63H 2200/00; G04G 11/00; G04G 13/02; G04G 21/025; G04G 21/02

See application file for complete search history.

(56) References Cited

U.S. PATENT DOCUMENTS

| | | | | |
|---|---|---|---|---|
| 10,401,799 B2 | 9/2019 | Kusuda et al. | | |
| 11,231,772 B2 | 1/2022 | Atsumi | | |
| 2002/0080035 A1 | 6/2002 | Youdenko | | |
| 2005/0190065 A1* | 9/2005 | Ronnholm | ........... | A61B 5/4812 340/575 |
| 2014/0058703 A1 | 2/2014 | Kimishima et al. | | |
| 2014/0269224 A1* | 9/2014 | Huh | ..................... | G04G 13/021 368/73 |

(Continued)

FOREIGN PATENT DOCUMENTS

| | | |
|---|---|---|
| CN | 107953346 A | 4/2018 |
| CN | 210132507 U | 3/2020 |

(Continued)

OTHER PUBLICATIONS

Japanese Office Action (and an English language translation thereof) dated Mar. 12, 2024, issued in counterpart Japanese Application No. 2022-047794.

(Continued)

*Primary Examiner* — Mohammad Ali
*Assistant Examiner* — Sheela Rao
(74) *Attorney, Agent, or Firm* — Holtz, Holtz & Volek PC

(57) ABSTRACT

An apparatus control device includes a processor that acquires a stimulus acting on an apparatus from an outside, and sets an action time based on the acquired stimulus data, the action time being related to a behavior that a user of the apparatus habitually performs, the action time being a time at which the apparatus acts.

13 Claims, 16 Drawing Sheets

(56) References Cited

U.S. PATENT DOCUMENTS

| | | | | |
|---|---|---|---|---|
| 2015/0238854 | A1* | 8/2015 | Olson | A63F 13/235 463/42 |
| 2018/0082550 | A1 | 3/2018 | Read et al. | |
| 2021/0205701 | A1 | 7/2021 | Shindo et al. | |

FOREIGN PATENT DOCUMENTS

| | | | |
|---|---|---|---|
| EP | 2777484 | A2 | 9/2014 |
| EP | 2777484 | A3 | 11/2014 |
| JP | 2004501377 | A | 1/2004 |
| JP | 2009045227 | A | 3/2009 |
| JP | 2014002088 | A | 1/2014 |
| JP | 2016007446 | A | 1/2016 |
| JP | 2019217122 | A | 12/2019 |
| JP | 2021069767 | A | 5/2021 |
| WO | 2016052100 | A1 | 4/2016 |

OTHER PUBLICATIONS

Extended European Search Report (EESR) dated Aug. 21, 2023, issued in counterpart European Application No. 23160649.2.

European Office Action dated Aug. 14, 2025, issued in counterpart European Application No. 23160649.2.

* cited by examiner

| DATE/TIME | SLEEP STATE | ··· |
|---|---|---|
| ⋮ | ⋮ | ⋮ |
| OCT. 26 00:10 | ON | ··· |
| OCT. 26 06:10 | OFF | ··· |
| OCT. 27 00:30 | ON | ··· |
| OCT. 27 05:50 | OFF | ··· |
| OCT. 27 13:00 | ON | ··· |
| OCT. 27 13:30 | OFF | ··· |
| OCT. 27 23:40 | ON | ··· |
| OCT. 28 05:20 | OFF | ··· |
| OCT. 28 23:30 | ON | ··· |
| OCT. 29 06:10 | OFF | ··· |
| OCT. 30 00:00 | ON | ··· |
| OCT. 30 05:20 | OFF | ··· |
| OCT. 30 12:40 | ON | ··· |
| OCT. 30 13:00 | OFF | ··· |
| OCT. 30 17:30 | ON | ··· |
| OCT. 30 18:00 | OFF | ··· |
| OCT. 31 00:20 | ON | ··· |
| OCT. 31 07:50 | OFF | ··· |
| ⋮ | ⋮ | ⋮ |

| DATE | START TIME | END TIME | AMOUNT OF SLEEP TIME | AMOUNT OF TIME UNTIL STOP | NAP | ... |
|---|---|---|---|---|---|---|
| ⋮ | ⋮ | ⋮ | ⋮ | ⋮ | ⋮ | ⋮ |
| OCT. 26 (MON) | 0:10 | 6:10 | 5 HOURS 40 MINUTES | 20 SECONDS | — | ... |
| OCT. 27 (TUE) | 0:30 | 5:50 | 5 HOURS 50 MINUTES | 30 SECONDS | — | ... |
| OCT. 27 (TUE) | 13:00 | 13:30 | — | 5 SECONDS | 1 | ... |
| OCT. 28 (WED) | 23:40 | 5:20 | 5 HOURS 40 MINUTES | 40 SECONDS | — | ... |
| OCT. 29 (THURS) | 23:30 | 6:10 | 6 HOURS 40 MINUTES | 30 SECONDS | — | ... |
| OCT. 30 (FRI) | 0:00 | 5:20 | 6 HOURS 10 MINUTES | 25 SECONDS | — | ... |
| OCT. 30 (FRI) | 12:40 | 13:00 | — | 5 SECONDS | 1 | ... |
| OCT. 30 (FRI) | 17:30 | 18:00 | — | 10 SECONDS | 2 | ... |
| OCT. 31 (SAT) | 0:20 | 7:50 | 7 HOURS 30 MINUTES | 5 MINUTES 20 SECONDS | — | ... |
| NOV. 1 (SUN) | 23:40 | 8:40 | 9 HOURS 0 MINUTES | 11 MINUTES 40 SECONDS | — | ... |
| NOV. 2 (MON) | 0:10 | 6:10 | 6 HOURS 0 MINUTES | 50 SECONDS | — | ... |
| NOV. 3 (HOLIDAY) | 0:40 | 8:10 | 7 HOURS 30 MINUTES | 3 MINUTES 10 SECONDS | — | ... |
| ⋮ | ⋮ | ⋮ | ⋮ | ⋮ | ⋮ | ⋮ |

| DAY OF THE WEEK/HOLIDAY | BEDTIME (AVERAGE) | WAKE-UP TIME (AVERAGE) | AMOUNT OF SLEEP TIME (AVERAGE) | AMOUNT OF TIME UNTIL STOP (AVERAGE) | ... |
|---|---|---|---|---|---|
| MON | 0:10 | 6:00 | 5 HOURS 40 MINUTES | 5 MINUTES 15 SECONDS | ... |
| TUE | 0:30 | 5:50 | 5 HOURS 20 MINUTES | 35 SECONDS | ... |
| WED | 23:30 | 5:30 | 6 HOURS 00 MINUTES | 20 SECONDS | ... |
| THU | 23:30 | 6:00 | 6 HOURS 30 MINUTES | 40 SECONDS | ... |
| FRI | 0:00 | 5:30 | 5 HOURS 30 MINUTES | 30 SECONDS | ... |
| SAT | 0:20 | 8:00 | 7 HOURS 40 MINUTES | 6 MINUTES 10 SECONDS | ... |
| SUN | 23:30 | 8:30 | 9 HOURS 00 MINUTES | 12 MINUTES 10 SECONDS | ... |
| HOLIDAY | 0:20 | 8:15 | 7 HOURS 55 MINUTES | 15 MINUTES 30 SECONDS | ... |

| NAP GROUP | START TIME (AVERAGE) | END TIME (AVERAGE) | AMOUNT OF SLEEP TIME (AVERAGE) | AMOUNT OF TIME UNTIL STOP (AVERAGE) | ... |
|---|---|---|---|---|---|
| TUE 1 | 13:00 | 13:30 | 30 MINUTES | 5 SECONDS | ... |
| FRI 1 | 12:40 | 13:00 | 20 MINUTES | 5 SECONDS | ... |
| FRI 2 | 17:30 | 18:00 | 30 MINUTES | 10 SECONDS | ... |
| SAT 1 | 14:00 | 14:30 | 30 MINUTES | — | ... |
| SUN 1 | 14:00 | 14:30 | 30 MINUTES | 10 SECONDS | ... |
| SUN 2 | 16:00 | 16:20 | 20 MINUTES | — | ... |
| HOLIDAY 1 | 13:20 | 13:40 | 20 MINUTES | — | ... |
| HOLIDAY 2 | 15:30 | 15:45 | 15 MINUTES | — | ... |
| ⋮ | ⋮ | ⋮ | ⋮ | ⋮ | ⋮ |

APPARATUS CONTROL DEVICE, APPARATUS CONTROL METHOD, AND RECORDING MEDIUM

CROSS-REFERENCE TO RELATED APPLICATION

This application claims the benefit of Japanese Patent Application No. 2022-047794, filed on Mar. 24, 2022, the entire disclosure of which is incorporated by reference herein.

FIELD OF THE INVENTION

This application relates generally to an apparatus control device, an apparatus control method, and a non-transitory recording medium.

BACKGROUND OF THE INVENTION

In the related art, an alarm clock is used as a device for waking a user. Many conventional alarm clocks wake the user by playing a sound at a loud volume at a specified time. As such, the user frequently wakes with unpleasant feelings toward this loud volume. To eliminate these unpleasant feelings, Unexamined Japanese Patent Application Publication No. 2016-7446, for example, describes a wake-up device that provides a pleasant awakening by causing an awakener to vibrate on the basis of a biological signal.

SUMMARY OF THE INVENTION

An apparatus control device according to the present disclosure includes a processor that:

acquires stimulus data representing a stimulus acting on an apparatus from an outside, and sets an action time based on the acquired stimulus data, the action time being related to a behavior that a user of the apparatus habitually performs, the action time being a time at which the apparatus acts.

BRIEF DESCRIPTION OF THE DRAWINGS

A more complete understanding of this application can be obtained when the following detailed description is considered in conjunction with the following drawings, in which:

FIG. 4 is a drawing illustrating an example of log data according to the embodiment;

FIG. 5 is a drawing illustrating an example of sleep data according to the embodiment;

FIG. 6 is a drawing illustrating an example of wake-up control data according to the embodiment;

FIG. 11 is a drawing illustrating an example of an alarm setting screen when an alarm is set to ON;

FIG. 14 is a drawing illustrating an example of nap wake-up control data according to Modified Example 1;

DETAILED DESCRIPTION OF THE INVENTION

Figure 1:
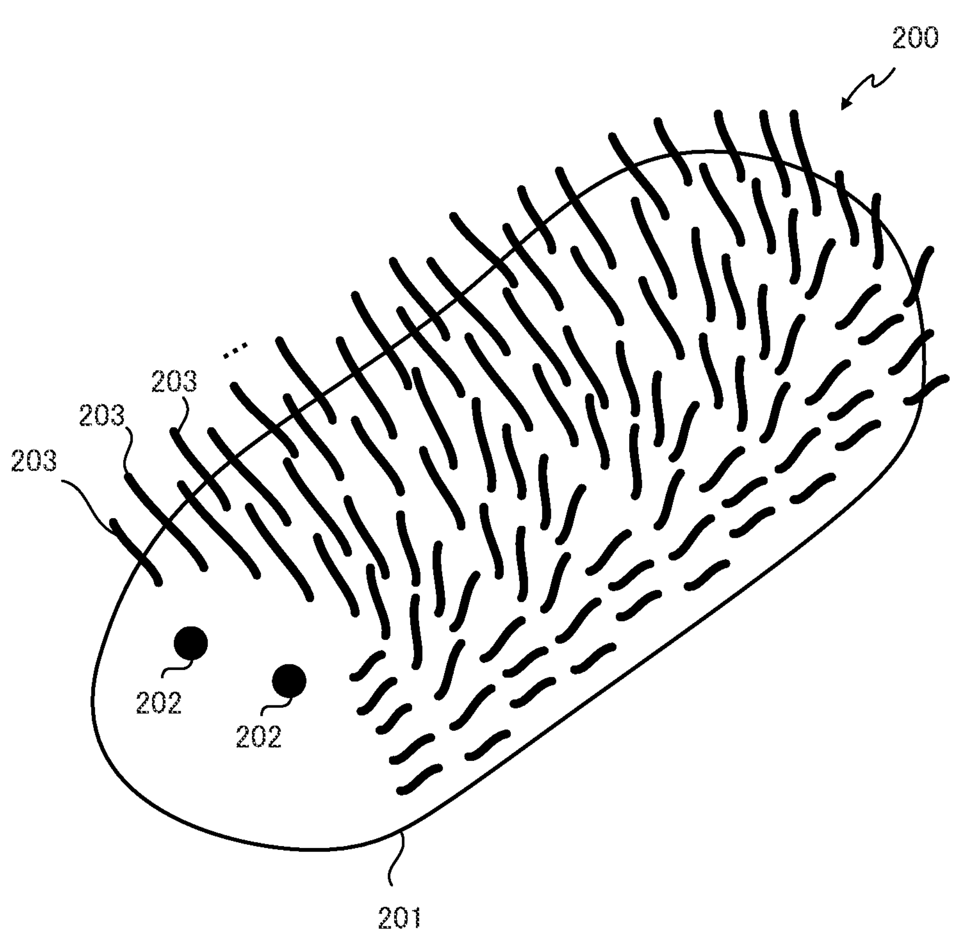
FIG. 1 is a drawing illustrating the appearance of a robot according to an embodiment.

Hereinafter, embodiments are described while referencing the drawings. Note that, in the drawings, identical or corresponding components are denoted with the same reference numerals.

Embodiments

Figure 2:
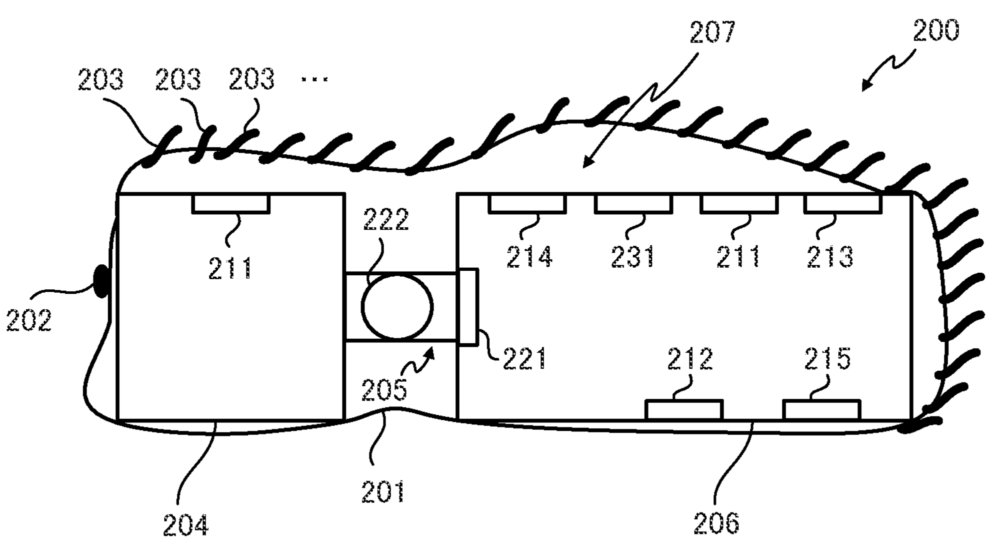
FIG. 2 is a cross-sectional view, seen from a side surface of the robot according to the embodiment.

An embodiment in which an apparatus control device of the present disclosure is applied to a robot 200 illustrated in FIG. 1 is described while referencing the drawings. The robot 200 according to the embodiment is a pet robot that is driven by a rechargeable battery and that resembles a small animal. As illustrated in FIG. 1, the robot 200 is covered with an exterior 201 provided with bushy fur 203 and decorative parts 202 resembling eyes. A housing 207 of the robot 200 is accommodated in the exterior 201. As illustrated in FIG. 2, the housing 207 of the robot 200 includes a head 204, a coupler 205, and a torso 206. The head 204 and the torso 206 are coupled by the coupler 205.

The coupler 205 couples the torso 206 and the head 204 so as to enable rotation (by the twist motor 221) around a first rotational axis that passes through the coupler 205 and extends in a front-back direction of the torso 206. The coupler 205 couples the torso 206 and the head 204 so as to enable rotation (by the swing motor 222) around a second rotational axis that passes through the coupler 205 and extends in a width direction of the torso 206. Note that, in FIG. 2, an example is illustrated in which the first rotational axis and the second rotational axis are orthogonal to each other, but a configuration is possible in which the first and second rotational axes are not orthogonal to each other.

As illustrated in FIG. 2, the robot 200 includes a touch sensor 211 on the head 204. The touch sensor 211 can detect petting or striking of the head 204 by a user. The robot 200 also includes the touch sensor 211 on the torso 206. The touch sensor 211 can detect petting or striking of the torso 206 by the user.

The robot 200 includes an acceleration sensor 212 and a gyrosensor 215 on the torso 206. The acceleration sensor 212 and the gyrosensor 215 can detect an attitude of the robot 200 itself, and can detect being picked up, the orientation being changed, being thrown, and the like by the user. The robot 200 includes a microphone 213 on the torso 206. The microphone 213 can detect external sounds. Furthermore, the robot 200 includes a speaker 231 on the torso 206. The speaker 231 can be used to emit a sound (for example, an animal sound of the robot 200), sing songs, and the like.

The robot 200 includes an illuminance sensor 214 on the torso 206. The illuminance sensor can detect ambient brightness. Note that, the exterior 201 is made from a material that transmits light and, as such, the robot 200 can detect the ambient brightness by the illuminance sensor 214 even though the robot 200 is covered by the exterior 201.

Note that, in the present embodiment, the acceleration sensor 212, the microphone 213, the illuminance sensor 214, the gyrosensor 215, and the speaker 231 are provided on the torso 206, but a configuration is possible in which all or a portion of these components are provided on the head 204. Note that a configuration is possible in which, in addition to the acceleration sensor 212, the microphone 213, the illuminance sensor 214, the gyrosensor 215, and the speaker 231 provided on the torso 206, all or a portion of these components are also provided on the head 204. The touch sensor 211 is respectively provided on the head 204 and the torso 206, but a configuration is possible in which the touch sensor 211 is provided on only one of the head 204 and the torso 206. Moreover, a configuration is possible in which a plurality of any of these components is provided.

Figure 3:
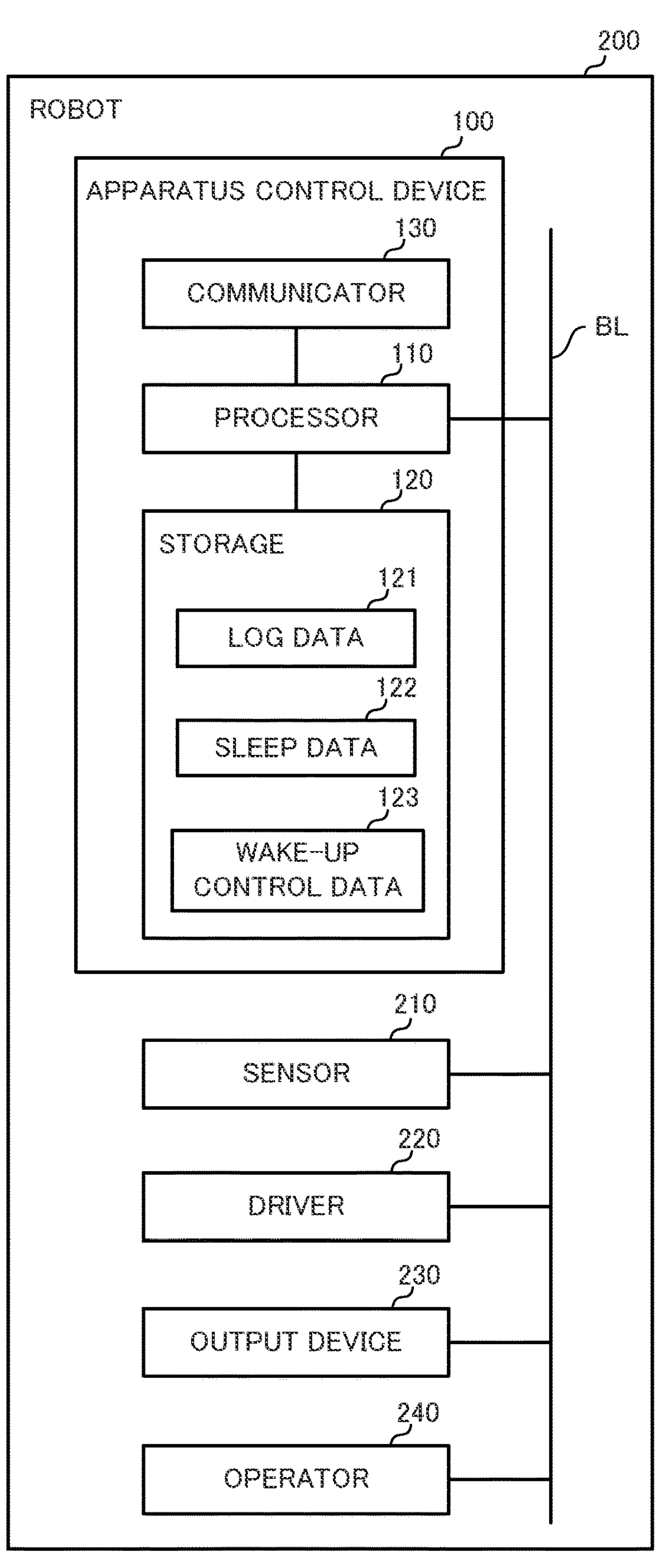
FIG. 3 is a block diagram illustrating the functional configuration of the robot according to the embodiment.

Next, the functional configuration of the robot 200 is described. As illustrated in FIG. 3, the robot 200 includes an apparatus control device 100, a sensor 210, a driver 220, an output device 230, and an operator 240. The apparatus control device 100 includes a processor 110, a storage 120, and a communicator 130. In FIG. 3, the apparatus control device 100, and the sensor 210, the driver 220, the output device 230, and the operator 240 are connected to each other via a bus line BL, but this is merely an example. A configuration is possible in which the apparatus control device 100, and the sensor 210, the driver 220, the output device 230, and the operator 240 are connected by a wired interface such as a universal serial bus (USB) cable or the like, or by a wireless interface such as Bluetooth (registered trademark) or the like. Additionally, a configuration is possible in which the processor 110, and the storage 120 and the communicator 130 are connected via a bus line BL or the like.

The apparatus control device 100 controls, by the processor 110 and the storage 120, the actions of the robot 200.

In one example, the processor 110 is configured from a central processing unit (CPU) or the like, and executes various processings described later using programs stored in the storage 120. Note that the processor 110 is compatible with multithreading functionality, in which a plurality of processings are executed in parallel. As such, the processor 110 can execute the various processings described below in parallel. The processor 110 is also provided with a clock function and a timer function, and can measure the date and time, and the like.

The storage 120 is configured from read-only memory (ROM), flash memory, random access memory (RAM), or the like. Programs to be executed by the CPU of the processor 110 and data needed in advance to execute these programs are stored in the ROM. The flash memory is writable non-volatile memory, and stores data that is desired to be retained even after the power is turned OFF. Data that is created or modified during the execution of the programs is stored in the RAM.

The communicator 130 includes a communication module compatible with a wireless local area network (LAN), Bluetooth (registered trademark), or the like, and carries out data communication with a smartphone or similar external device.

The sensor 210 includes the touch sensor 211, the acceleration sensor 212, the microphone 213, the illuminance sensor 214, and the gyrosensor 215 described above. The processor 110 acquires, via the bus line BL and as stimulus data, detection values detected by the various sensors of the sensor 210. The stimulus data expresses a stimulus acting on the robot 200 from an outside. Note that a configuration is possible in which the sensor 210 includes sensors other than the touch sensor 211, the acceleration sensor 212, the microphone 213, the illuminance sensor 214, and the gyrosensor 215. The types of stimuli acquirable by the processor 110 can be increased by increasing the types of sensors of the sensor 210. In contrast, when it is acceptable that the types of stimuli are few, the types of sensors may be reduced. In such a case, it is sufficient that the sensor 210 includes at least one sensor from among the touch sensor 211, the acceleration sensor 212, the microphone 213, the illuminance sensor 214, and the gyrosensor 215.

The touch sensor 211 detects contacting by some sort of object. The touch sensor 211 is configured from a pressure sensor or a capacitance sensor, for example. The processor 110 acquires a contact strength and/or a contact time on the basis of the detection values from the touch sensor 211 and, on the basis of these values, can detect a stimulus caused by the user intentionally contacting the robot 200. Examples of such contact include the user petting the robot 200, the user striking the robot 200, and the like (for example, see Unexamined Japanese Patent Application Publication No. 2019-217122). Note that a configuration is possible in which the processor 110 detects these stimuli by a sensor other than the touch sensor 211 (for example, see Japanese Patent No. 6575637).

The acceleration sensor 212 detects acceleration in three axial directions consisting of a forward-back direction, a width direction (left-right direction), and a vertical direction of the torso 206 of the robot 200. The acceleration sensor 212 detects gravitational acceleration when the robot 200 is stationary and, as such, the processor 110 can detect a current attitude of the robot 200 on the basis of the gravitational acceleration detected by the acceleration sensor 212.

Additionally, when, for example, the user picks up or throws the robot 200, the acceleration sensor 212 detects, in addition to the gravitational acceleration, acceleration caused by the movement of the robot 200. Accordingly, the processor 110 can acquire, as acceleration information, the detection values detected by the acceleration sensor 212, and can detect movement of the robot 200 by removing the gravitational acceleration component from these detection values. Additionally, the processor 110 can calculate a movement velocity of the robot 200 by integrating the acceleration caused by the movement of the robot 200, and can also calculate a movement distance of the robot 200 by integrating the calculated velocity.

The microphone 213 detects ambient sound of the robot 200. The processor 110 can, for example, detect, on the basis of a component of the sound detected by the microphone 213, that the user is speaking to the robot 200, that the user is clapping their hands, and the like.

The illuminance sensor 214 includes a light receiving element such as a photodiode or the like, and detects ambient brightness (illuminance). The processor 110 can acquire, as illuminance information, the illuminance detected by the illuminance sensor 214. For example, when the illuminance sensor 214 detects that the surroundings are dark, the processor 110 can carry out control for putting the robot 200 to pseudo sleep (setting to a sleep state).

The gyrosensor 215 detects an angular velocity of the robot 200. The processor 110 can detect, on the basis of the detection values detected by the gyrosensor 215, that the user is changing the orientation (for example, is rotating) of the robot 200.

The driver 220 includes the twist motor 221 and the swing motor 222 as movable parts for expressing movement of the robot 200. The driver 220 (the twist motor 221 and the swing motor 222) are driven by the processor 110. The twist motor 221 and the swing motor 222 are servo motors, and operate so as to rotate to specific angles on the basis of commands from the processor 110. Note that a configuration is possible in which the driver 220 includes another appropriate actuator such as, for example, a hydraulic motor or the like, as the movable part. The processor 110 controls the driver 220 and, as a result, the robot 200 can express actions such as, for example, lifting the head 204 up (rotating upward around the second rotational axis), twisting the head 204 sideways (twisting/rotating to the right or to the left around the first rotational axis), and the like. Note that action control data for performing these actions is stored in advance in the storage 120.

The output device 230 includes the speaker 231, and sound is output from the speaker 231 as a result of the processor 110 inputting sound data into the output device 230. For example, the robot 200 emits a pseudo animal sound as a result of the processor 110 inputting animal sound data of the robot 200 into the output device 230. This animal sound data is also stored in the storage 120, and an animal sound is selected on the basis of the detected stimulus, a wake-up action mode described later, and the like. Note that the output device 230 constituted by the speaker 231 is also called a sound outputter.

A configuration is possible in which, instead of the speaker 231 or in addition to the speaker 231, a display such as a liquid crystal display, a light emitter such as a light emitting diode (LED), a vibration component such as a vibrator, or the like is provided as the output device 230. Moreover, a configuration is possible in which, as a wake-up action, the processor 110 displays some sort of image on the display, causes the LED or the like to emit light, or causes the vibration component to vibrate.

In one example, the operator 240 is configured from an operation button, a volume knob, or the like. The operator 240 is an interface for receiving operations performed by the user (owner or borrower) such as, for example, turning the power ON/OFF, adjusting the volume of the output sound, and the like. Note that a configuration is possible in which, in order to further enhance a sense of lifelikeness, the robot 200 includes only a power switch as the operator 240 on the inside of the exterior 201, and does not include other operation buttons, the volume knob, and the like. In such a case as well, operations such as adjusting the volume of the robot 200 can be performed using an external smartphone or the like connected via the communicator 130.

Next, of the data stored in the storage 120, characteristic data of present embodiment, namely, log data 121, sleep data 122, and wake-up control data 123 are described in order.

As illustrated in FIG. 4, the log data 121 is data in which a timing at which the processor 110 transitions the robot 200 to the sleep state (date and time at which the sleep state is set to ON) on the basis of the stimulus detected by the sensor 210, and a timing at which the robot 200 is returned to a normal state (date and time at which the sleep state is set to OFF) are recorded.

As illustrated in FIG. 5, the sleep data 122 is data in which data related to the "sleeping" of the user (sleep start time, sleep end time, amount of sleep time, amount of time until the user performs an operation to stop the wake-up action (amount of time until stop), information about whether a nap (nap), and the like), which is a behavior that the user habitually performs, is recorded. This data related to the "sleeping" of the user is acquired by the processor 110 on the basis of the log data 121.

As illustrated in FIG. 6, the wake-up control data 123 is data in which data of times or the like (average bedtime, average wake-up time, average amount of sleep time, average amount of time until stop, and the like of the user) at which the robot 200 is caused to perform the wake-up action is recorded for every date attribute (day of the week, holiday, or the like). This data of the times or the like is acquired by the processor 110 on the basis of the sleep data 122.

Figure 7:
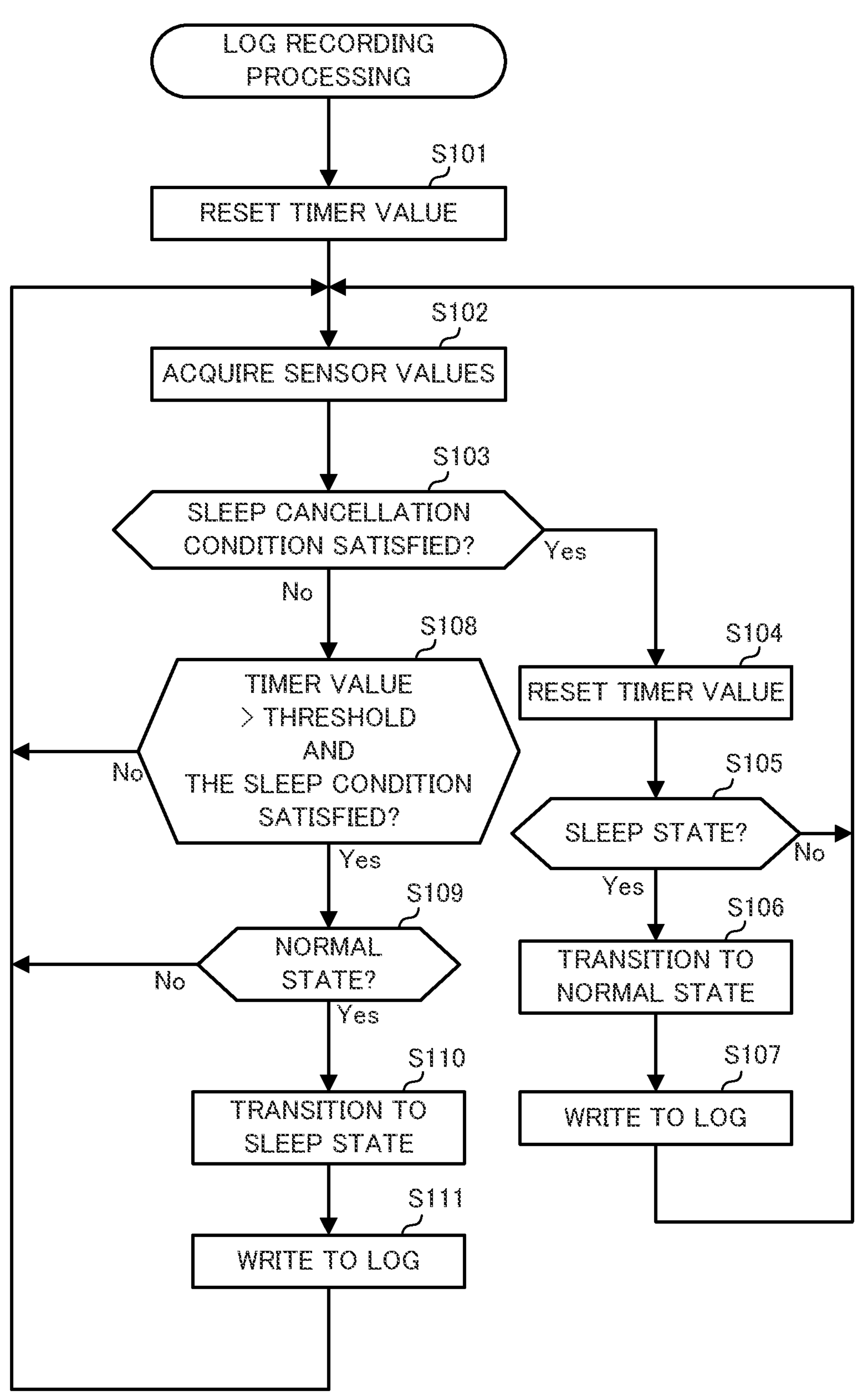
FIG. 7 is a flowchart of log recording processing according to the embodiment.

Next, log recording processing executed by the processor 110 of the apparatus control device 100 is described while referencing the flowchart illustrated in FIG. 7. The log recording processing is processing in which the apparatus control device 100 records, in a log and on the basis of the detection values from the sensor 210 and the like, timings at which the robot 200 is transitioned to the sleep state, recovered to the normal state, and the like. When the user turns ON the power of the robot 200, execution of a thread of this log recording processing is started in parallel with other processings of the robot 200 (for example, robot control processing, and the like).

Note that the robot control processing, which is started in parallel with the other processings when the power of the robot 200 is turned ON, is processing in which the processor 110 controls the driver 220 and the output device 230 on the basis of the detection values of the sensor 210 and the like to express movement of the robot 200, output sounds such as animal sounds or the like, and the like. Details about this robot control processing can be referenced in Japanese Unexamined Patent Application Publication No 2021-69767, for example, and is omitted herein. Next, the log recording processing is described.

Firstly, the processor 110 resets a value of a timer of the timer function to 0 (step S101). Next, the processor 110 acquires values (sensor values) detected by the sensor 210 (step S102). When there is some sort of stimulus, this stimulus is reflected in the sensor values. The sensor values acquired here are detection values from the touch sensor 211, the acceleration sensor 212, the illuminance sensor 214, and the gyrosensor 215, respectively.

Then, the processor 110 determines whether the sensor values acquired in step S102 satisfy a sleep cancellation condition (step S103). A condition desired by the user can be set as desired in advance by the user as the sleep cancellation condition. Here, the sleep cancellation condition is set so as to be satisfied when a stimulus, namely, "lifted up with the head 204 upward" or "moved a certain distance or longer", is detected. Accordingly, when the acceleration sensor 212 detects that the robot 200 is lifted up with the head 204 upward or the robot 200 is moved a certain distance or longer, the sleep cancellation condition is satisfied.

When the sleep cancellation condition is satisfied (step S103; Yes), the processor 110 resets the timer value (step S104). Then, the processor 110 determines whether the robot 200 is in the sleep state (step S105). When the robot 200 is not in the sleep state (step S105; No), the robot 200 is already in the normal state and, as such, the processor 110 returns to step S102.

When the robot 200 is in the sleep state (step S105; Yes), the processor 110 transitions the robot 200 to the normal state (step S106). Then, the processor 110 records, as the log data 121 and in the storage 120, the date and time, and that the sleep state is OFF (step S107), and returns to step S102.

Meanwhile, when the sleep cancellation condition is not satisfied in step S103 (step S103; No), the processor 110 determines whether the timer value exceeds a sleep threshold and also a sleep condition is satisfied (step S108). The sleep threshold can be set in advance as desired by the user. Here, the sleep threshold is set to 10 minutes, for example. The sleep condition can also be set as desired in advance to a condition desired by the user. Here, the sleep condition is set to be satisfied when the surroundings are dark and also touching, picking up, and/or moving of the robot 200 by the user has not been performed for an amount of time longer than or equal to the sleep threshold. Accordingly, the sleep condition is satisfied when the illuminance sensor 214 detects that the surroundings are in a dark state, and the touch sensor 211, the acceleration sensor 212, and the gyrosensor 215 do not detect anything (more specifically, do not detect anything other than gravitational acceleration) for 10 minutes or longer.

When the timer value is less than or equal to the sleep threshold or the sleep condition is not satisfied (step S108; No), the processor 110 returns to step S102.

Meanwhile, when the timer value is longer than the sleep threshold and, also, the sleep condition is satisfied (step S108; Yes), the processor 110 determines whether the robot 200 is in the normal state (step S109). When the robot 200 is not in the normal state (step S109; No), the robot 200 is already in the sleep state and, as such, the processor 110 returns to step S102.

When the robot 200 is in the normal state (step S109; Yes), the processor 110 transitions the robot 200 to the sleep state (step S110). Then, the processor 110 records, as the log data 121 and in the storage 120, the date and time, and that the sleep state is ON (step S111), and returns to step S102.

As a result of the log recording processing described above, the log data 121 that is a history of the sleep state of the robot 200 is stored in the storage 120 in, for example, the form illustrated in FIG. 4. The robot 200 exists beside the user as a pet robot and, as such, it is assumed that the robot 200 enters the sleep state when the user goes to bed, and the robot 200 enters the normal state when the user wakes up. Accordingly, the data related to the sleeping of the user (the sleep data 122) can be acquired on the basis of the log data 121.

Note that, in the log recording processing, it is not necessary that the ON/OFF of the sleep state of the robot 200 be recorded. For example, a configuration is possible in which the user wears a biological information detection device (for example, a wristwatch having a built-in biosensor) provided with a biosensor (a sensor that detects biological information of the user such as a pulse or the like) and, when a determination is made on the basis of a signal from the biological information detection device that the user is sleeping, "sleep state ON", meaning that "the user has gone to sleep", is recorded together with the date and time in the log data 121, and when a determination is made on the basis of the signal from the biological information detection device that the user has woken up, "sleep state OFF", meaning that "the user has woken up", is recorded together with the date and time in the log data 121.

Additionally, a configuration is possible in which, even when the user is not wearing the biological information detection device, when the microphone 213 detects sleeping breathing of the user, "sleep state ON", meaning that "the user has gone to sleep", is recorded together with the date and time in the log data 121, and when the microphone 213 detects the voice of the user saying "good morning" or the like, "sleep state OFF", meaning that "the user has woken up", is recorded together with the date and time in the log data 121.

Figure 8:
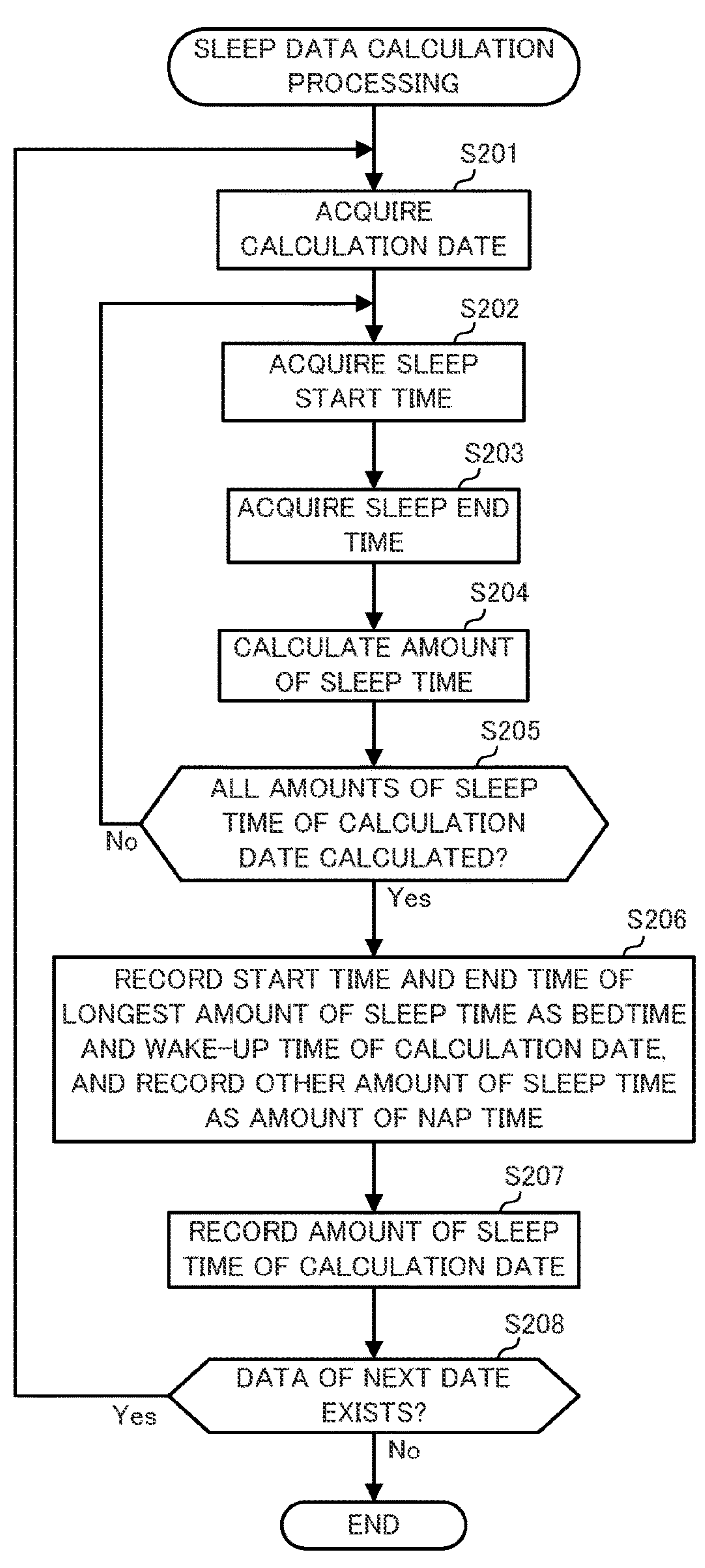
FIG. 8 is a flowchart of sleep data calculation processing according to the embodiment.

Next, sleep data calculation processing, which is processing in which the processor 110 acquires, on the basis of the log data 121, the data related to the sleeping of the user (the sleep data 122), is described while referencing FIG. 8. Execution of the sleep data calculation processing starts when the processor 110 transitions the robot 200 from the sleep state to the normal state (after the log data is recorded).

Firstly, the processor 110 acquires a calculation date (step S201). This calculation date typically is the date on which the sleep data calculation processing is executed. However, when the sleep data calculation processing has not been executed for more than one day, the date on which the sleep data calculation processing is executed last (the date registered last in the sleep data 122) is the calculation date and, thereafter, the processor 110 advances the calculation date one day every time step S201 is returned to from step S207.

Then, the processor 110 references the log data 121 and acquires the sleep start time of the calculation date (step S202). The time at which the sleep state becomes "ON" in the log data 121 of the calculation date is acquired as the sleep start time. However, when the first sleep state of the log data 121 of the calculation date is "OFF", the time at which the sleep state is "ON" last in the log data 121 of the date prior to the calculation date is acquired as the sleep start time of the calculation date.

Next, the processor 110 references the log data 121 and acquires the sleep end time of the calculation date (step S203). The time at which the sleep state becomes "OFF" in the log data 121 of the calculation date is acquired as the sleep end time. Then, the processor 110 calculates a difference between the sleep end time and the sleep start time as the amount of sleep time (step S204).

Then, the processor 110 determines whether all of the amounts of sleep time of the calculation date are calculated (step S205). When all of the amounts of sleep time are not calculated (step S205; No), the processor 110 returns to step S202. For example, in a case such as when the user takes a nap, a plurality of sleep start times and a plurality of sleep end times will exist on one day and, as such, a plurality of amounts of sleep time is calculated. However, a configuration is possible in which the processor 110 ignores (does not determine that sleep is performed) sleep of an amount of sleep time that is less than a nap determination threshold (for example, 15 minutes).

When all of the amounts of sleep time of the calculation date are calculated (step S205; Yes), the processor 110 records, in the sleep data 122 and as a bedtime and a wake-up time of the calculation date, the sleep start time and the sleep end time of the longest amount of sleep time among the amounts of sleep time of the calculation date, and records, in the sleep data 122 and as the start time and the end time of the nap of the calculation date, the sleep start time and the sleep end time of the other amount of sleep time (step S206). Note that, since the user may take a nap two times or more in one day, the processor 110 marks the naps with numbers starting with No. 1 for the nap having the earliest start time, and records the numbers in the sleep data 122, thereby making it possible to distinguish between the various naps.

Then, the processor 110 records, in the sleep data 122 and as the amount of sleep time of the calculation date, the total of all the amounts of time calculated as the amounts of sleep time of that date (step S207). For example, in a case in which, on a certain date, the user goes to bed at 00:00, wakes up at 06:00, and takes a nap from 12:30 to 13:00, the amount of sleep time of that date is calculated as 6 hours+30 minutes, that is, 6 hours 30 minutes.

Then, the processor 110 determines whether the log data 121 of the date after the calculation date exists (step S208). When the log data 121 of the date after the calculation date exists (step S208; Yes), the processor 110 returns to step S201, advances the calculation date one, and repeats the calculation of the sleep data 122.

When the log data 121 of the date after the calculation date does not exist (step S208; No), the sleep data calculation processing is ended. The sleep data 122 is recorded in the storage 120 as a result of the sleep data calculation processing described above.

In one example, the sleep data calculation processing starts at 18:00 on October 30 when the robot 200 transitions to the normal state, and the log data 121 up to the start of the sleep data calculation processing (the data up to October 30), such as illustrated in FIG. 4, is recorded. In this case, the amount of sleep time starting at 00:00 on October 30 is 5 hours 20 minutes, the amount of sleep time starting at 12:40 is 20 minutes, and the amount of sleep time starting at 17:30 is 30 minutes.

The start time (00:00) of the longest amount of sleep time (5 hours 20 minutes) among the amounts of sleep time is the bedtime of October 30, and the end time (5:20) is the wake-up time of October 30. Moreover, a 20 minute nap (first nap) starts at 12:40 of October 30, and a 30 minute nap (second map) starts at 17:30. The amounts of sleep time of these naps (20 minutes and 30 minutes) are added to the longest amount of sleep time (5 hours 20 minutes), and the resulting "6 hours 10 minutes" is recorded in the sleep data 122 as the amount of sleep time of October 30.

As a result, as illustrated in FIG. 5, 00:00 (as the bedtime) and 05:20 (as the wake-up time) are respectively recorded as the start time and the end time corresponding to the longest amount of sleep time (5 hours 20 minutes) of October 30, and 6 hours 10 minutes is recorded as the amount of sleep time. Additionally, in order to distinguish the naps by order, as illustrated in FIG. 5, "1" and "2" are respectively recorded in the "nap" field of the sleep data 122 corresponding to the first nap and the "nap" field of the sleep data 122 corresponding to the second nap.

Note that, in FIG. 5, the "amount of time until stop" is also recorded in the sleep data 122. This "amount of time until stop" is recorded in wake-up processing described later. Prior to the wake-up processing being executed, nothing is recorded in the "amount of time until stop" of the sleep data 122.

Figure 9:
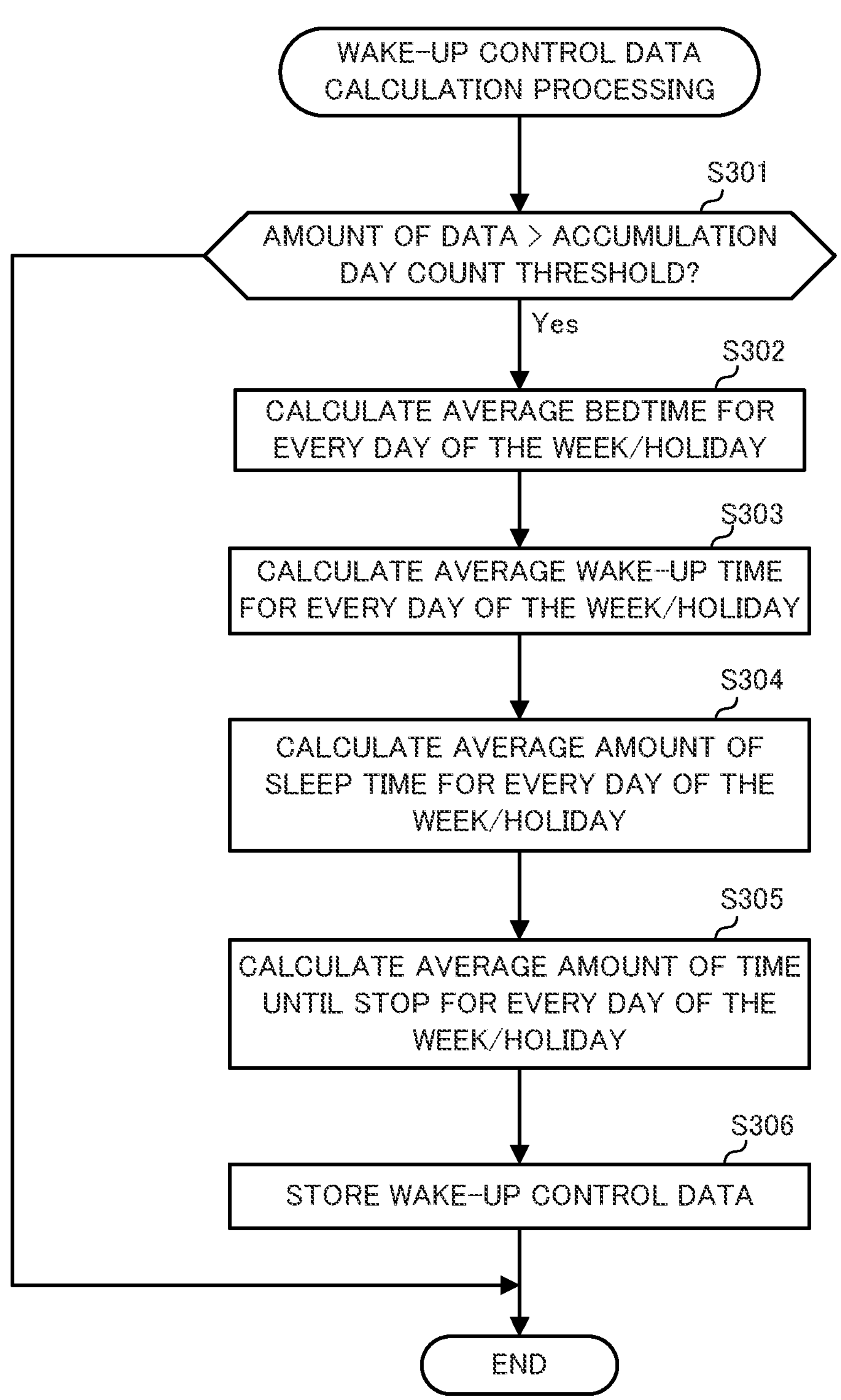
FIG. 9 is a flowchart of wake-up control data calculation processing according to the embodiment.

Next, wake-up control data calculation processing that is processing for calculating the wake-up control data 123 on the basis of the sleep data 122 is described while referencing FIG. 9. Execution of the wake-up control data calculation processing starts every time the processor 110 ends the execution of the sleep data calculation processing.

Firstly, the processor 110 determines whether an amount of data of the sleep data 122 exceeds an accumulation day count threshold (for example, from about two weeks to about one month) (step S301). Specifically, the processor 110 determines whether more of the sleep data 122 is accumulated than a predetermined accumulation day count threshold (for example, 30 days).

When the amount of data of the sleep data 122 is less than or equal to the accumulation day count threshold (step S301; No), the processor 110 determines that the wake-up control data 123 cannot be calculated yet and ends the wake-up control data calculation processing.

When the amount of data of the sleep data 122 exceeds the accumulation day count threshold (step S301; Yes), the processor 110 calculates an average bedtime for every day of the week/holiday on the basis of the data accumulated in the sleep data 122 (step S302).

Specifically, the processor 110 averages the sleep start time of the longest amount of sleep time of the various holidays among the data accumulated in the sleep data 122 to calculate the average bedtime of holidays. Additionally, the processor 110 averages the sleep start time of the longest amount of sleep time of each day of the week other than the holidays among the data accumulated in the sleep data 122 to calculate the average bedtime of that day of the week. For example, in a case in which November 3 is a Tuesday and a holiday, the processor 110 uses the sleep start time of November 3 in the calculation of the average bedtime of holidays, and does not use the sleep start time of November 3 in the calculation of the average bedtime of Tuesdays.

Next, the processor 110 calculates the average wake-up time for every day of the week/holiday on the basis of the data accumulated in the sleep data 122 (step S303). Specifically, the processor 110 averages the sleep end time of the longest amount of sleep time of the various days of the week/various holidays among the data accumulated in the sleep data 122 to calculate the average wake-up time of that day of the week/holidays. Note that, as when calculating the average bedtime, for example, in a case in which November 3 is a Tuesday and a holiday, the processor 110 uses the sleep end time of November 3 in the calculation of the average wake-up time of holidays, and does not use the sleep start time of November 3 in the calculation of the average wake-up time of Tuesdays.

Then, the processor 110 calculates the average amount of sleep time for every day of the week/holidays on the basis of the data accumulated in the sleep data 122 (step S304). Specifically, the processor 110 averages the amounts of sleep time (total of the amount of sleep time of that day) of the various days of the week/various holidays among the data accumulated in the sleep data 122 to calculate the average amount of sleep time of that day of the week/holidays. Note that, as when calculating the average bedtime, for example, in a case in which November 3 is a Tuesday and a holiday, the processor 110 uses the amount of sleep time of November 3 in the calculation of the average amount of sleep time of holidays, and does not use the amount of sleep time of November 3 in the calculation of the average amount of sleep time of Tuesdays.

Next, the processor 110 calculates the average amount of time until stop for every day of the week/holidays on the basis of the data accumulated in the sleep data 122 (step S305). Specifically, the processor 110 averages the amount of time until stop of the various days of the week/various holidays among the data accumulated in the sleep data 122 to calculate the average amount of time until stop of that day of the week/holidays. Note that, as when calculating the average bedtime, for example, in a case in which November 3 is a Tuesday and a holiday, the processor 110 uses the amount of time until stop of November 3 in the calculation of the average amount of time until stop of holidays, and does not use the amount of time until stop of November 3 in the calculation of the average amount of time until stop of Tuesdays. Additionally, since the amount of time until stop is not recorded until the wake-up processing described later is performed, the processor 110 uses only amounts of stop time that are already recorded when calculating the average amount of time until stop.

Then, the processor 110 stores the calculated average bedtime, the average wake-up time, the average amount of sleep time, and the average amount of time until stop in the storage 120 as the wake-up control data 123 (step S306), and ends the wake-up control data calculation processing.

As a result of the wake-up control data calculation processing described above, the wake-up control data 123 such as illustrated in FIG. 6 is stored in the storage 120.

Note that when data of holidays does not exist in the sleep data 122, the processor 110 uses data of Sundays also as data of holidays and stores that data as the wake-up control data 123.

Additionally, in the wake-up control data calculation processing illustrated in FIG. 9 and the wake-up control data 123 illustrated in FIG. 6, average values are used as representative values of each time (bedtime, wake-up time, amount of sleep time, and amount of time until stop), but average values need not necessarily be used. For example, a configuration is possible in which median values or mode values (mode values in one-minute units) of each time are used. For example, when using mode values, firstly, a mode value in a time width of a first period (for example, 10 minutes) is calculated and, then, a mode value in one-minute units within a mode period is calculated again and used as the representative value. Thus, a representative value obtained by calculating the mode value in a plurality of steps may be used.

Additionally, a configuration is possible in which the processor 110 obtains a distribution of each time (the start time and the end time) and, when a value of the distribution exceeds a certain reference threshold, determines that regularity cannot be found for that time, and does not record a representative value (average value) in the field corresponding to that time of the wake-up control data 123. Moreover, a configuration is possible in which, when a representative value is not recorded in the wake-up control data 123, the processor 110 does not execute a wake-up function and/or a notification function corresponding to that time (that function becomes OFF) in wake-up processing and notification processing described later. For example, a configuration is possible in which, when the value of the distribution of the wake-up time of Sundays exceeds the reference threshold, an auto wake-up function is not executed at the wake-up time of Sundays.

Figure 10:
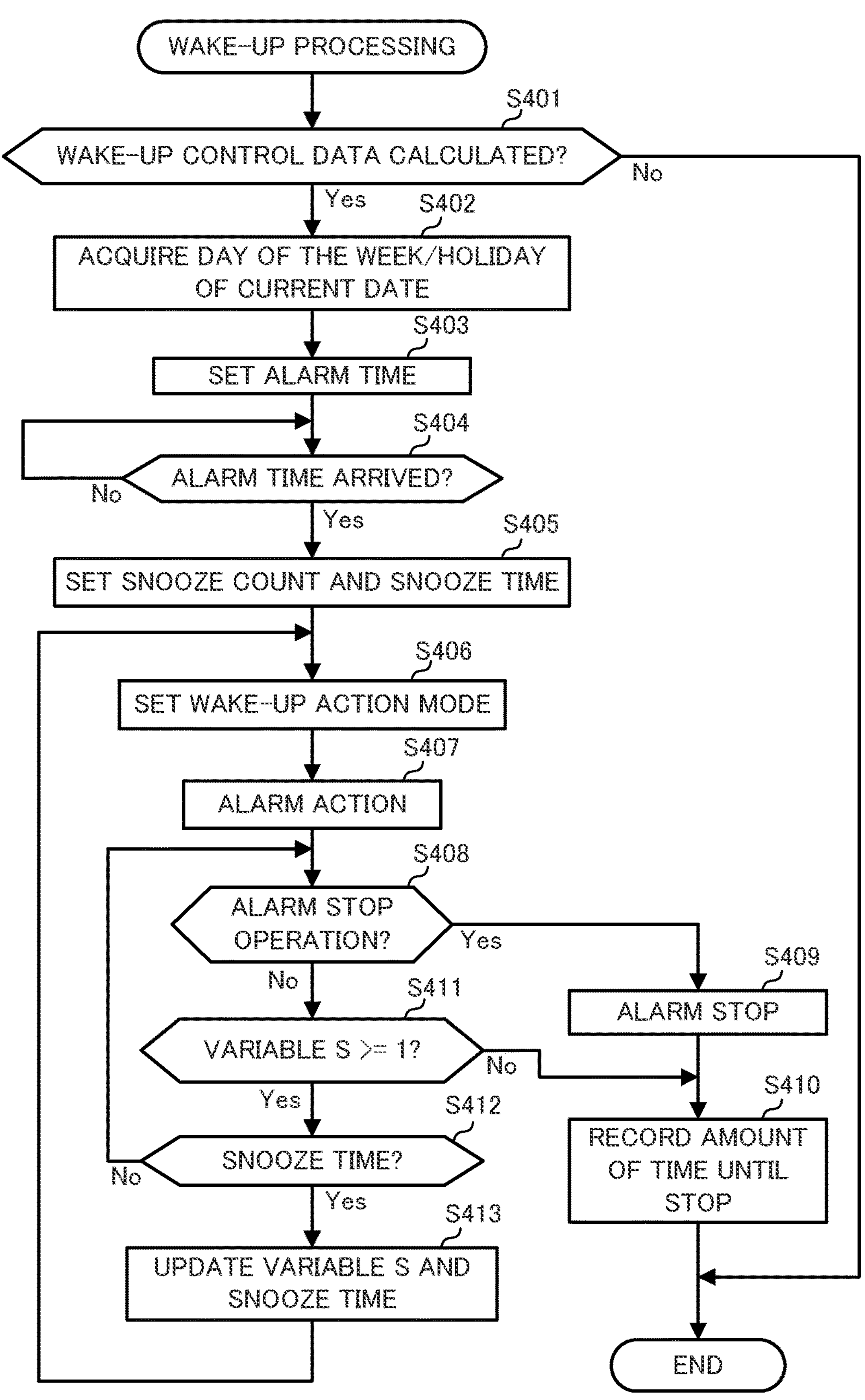
FIG. 10 is a flowchart of wake-up processing according to the embodiment.

Next, wake-up processing in which an alarm time is automatically set on the basis of the wake-up control data 123 is described while referencing FIG. 10. Execution of a thread of this wake-up processing (execution in parallel with other threads) starts every day at 00:00, that is, when the date changes.

Firstly, the processor 110 determines whether the wake-up control data 123 is already calculated (step S401). When the wake-up control data 123 is not calculated (step S401; No), the wake-up processing is ended.

When the wake-up control data 123 is calculated (step S401; Yes), the processor 110 acquires the day of the week/holiday of the current date (step S402). Then, the processor 110 sets the alarm time (step S403). Specifically, the processor 110 references the wake-up control data 123 and sets, as the alarm time, the average wake-up time of the day of the week/holidays acquired in step S402.

Next, the processor 110 uses the clock function to determine whether a current time is the alarm time (step S404). When the current time is not the alarm time (step S404; No), step S404 is executed.

When the current time is the alarm time (step S404; Yes), the processor 110 sets a snooze count (for example, two times) to a variable S, and sets a snooze time (for example, 5 minutes after the alarm time) (step S405). Note that the snooze count and the snooze time can be freely set in advance by the user.

Next, the processor 110 sets the wake-up action mode (step S406). Specifically, in the first setting of the wake-up action mode, the processor 110 references the wake-up control data 123, acquires the average amount of time until stop of the day of the week/holiday acquired in step S402, and sets the wake-up action mode in accordance with the acquired average amount of time until stop.

For example, in a case in which data of the average amount of time until stop does not exist, the wake-up action mode is set to a medium action mode (animal sound is emitted at a medium volume, wake-up action at a medium speed). Additionally, when the average amount of time until stop is less than a first amount of time threshold (for example, one minute), the wake-up action mode is set to a small action mode (no animal sound, small and slow wake-up action). Moreover, when the average amount of time until stop is longer than or equal to the first amount of time threshold and less than a second amount of time threshold (for example, three minutes), the wake-up action mode is set to an average action mode. Furthermore, when the average amount of time until stop is longer than or equal to the second amount of time threshold, the wake-up action mode is set to a large action mode (animal sound is emitted at a high volume, loud and fast wake-up action).

When returning to step S406 from step S413, described later, and setting the wake-up action mode, the processor 110 increases the action mode in accordance with an amount of alarm duration time (amount of time from when the alarm action is first started). Specifically, when the alarm action is first started in the small action mode, the action mode is changed to the medium action mode when the amount of alarm duration time is longer than or equal to the first amount of time threshold, and the action mode is changed to the large action mode when the amount of alarm duration time is longer than or equal to the second amount of time threshold. When the alarm action is first started in the medium action mode, the action mode is changed to the large action mode when the amount of alarm duration time is longer than or equal to the second amount of time threshold.

Then, the processor 110 controls the driver 220 and the speaker 231 in the wake-up action mode set in step S406 to execute the alarm action (step S407). The alarm action is an action in which, when the alarm time arrives, the robot 200 squirms such that the shape of the robot 200 is changed by the driver 220, speech (an animal sound) is emitted by the speaker 231, and the like. Due to this alarm action, the user can naturally wake up without feeling unpleasant.

Then, the processor 110 determines whether an alarm stop operation is performed (step S408). Any desired operation can be defined as the alarm stop operation but, in the present embodiment, a determination is made that the alarm stop operation is performed when the user lifts up the head of the robot 200 or the robot 200 is moved a certain distance or longer.

When the alarm stop operation by the user is performed (step S408; Yes), the processor 110 stops the alarm action in response to the alarm stop operation (step S409). Then, the processor 110 records, in the wake-up control data 123 and as the amount of time until stop, the amount of time from the start of the alarm action to when the alarm stop operation by the user is performed (step S410), and ends the wake-up processing.

When the alarm stop operation by the user is not performed (step S408; No), the processor 110 determines whether the value of the variable S to which the remaining snooze count is set is greater than or equal to 1 (step S411). When the value of the variable S is 0 (step S411; No), the processor 110 executes step S410. However, in this case, since the alarm stop operation is not yet performed, in step S410, a sufficiently large value such as "10 hours" or the like is recorded in the wake-up control data 123 as the amount of time until stop.

When the value of the variable S is greater than or equal to 1 (step S411; Yes), the processor 110 determines whether the current time is the snooze time (step S412). When the current time is not the snooze time (step S412; No), step S408 is executed.

When the current time is the snooze time (step S412; Yes), the processor 110 decreases the value of the variable S by 1, updates the snooze time (for example, sets to five minutes later) (step S413), and returns to step S406.

As a result of the wake-up processing described above, the apparatus control device 100 can wake up the user by an appropriate action at an appropriate time without the user setting the alarm time.

Note that, in the wake-up processing described above, all of the various days of the week/holidays are distinguished, and the average wake-up time of that day of the week/holidays is set as the alarm time. However, a configuration is possible in which a number of the days of the week are grouped and treated indiscriminately. For example, a configuration is possible in which Monday to Friday are treated indiscriminately as weekdays, and Saturday, Sunday, and holidays are indiscriminately treated as days off. In this case, a time obtained by averaging all of the wake-up times of Monday to Friday is set as the alarm time of the weekdays and, a time obtained by averaging all of the wake-up times of Saturday, Sunday, and the holidays is set as the alarm time of the days off.

Figure 11:
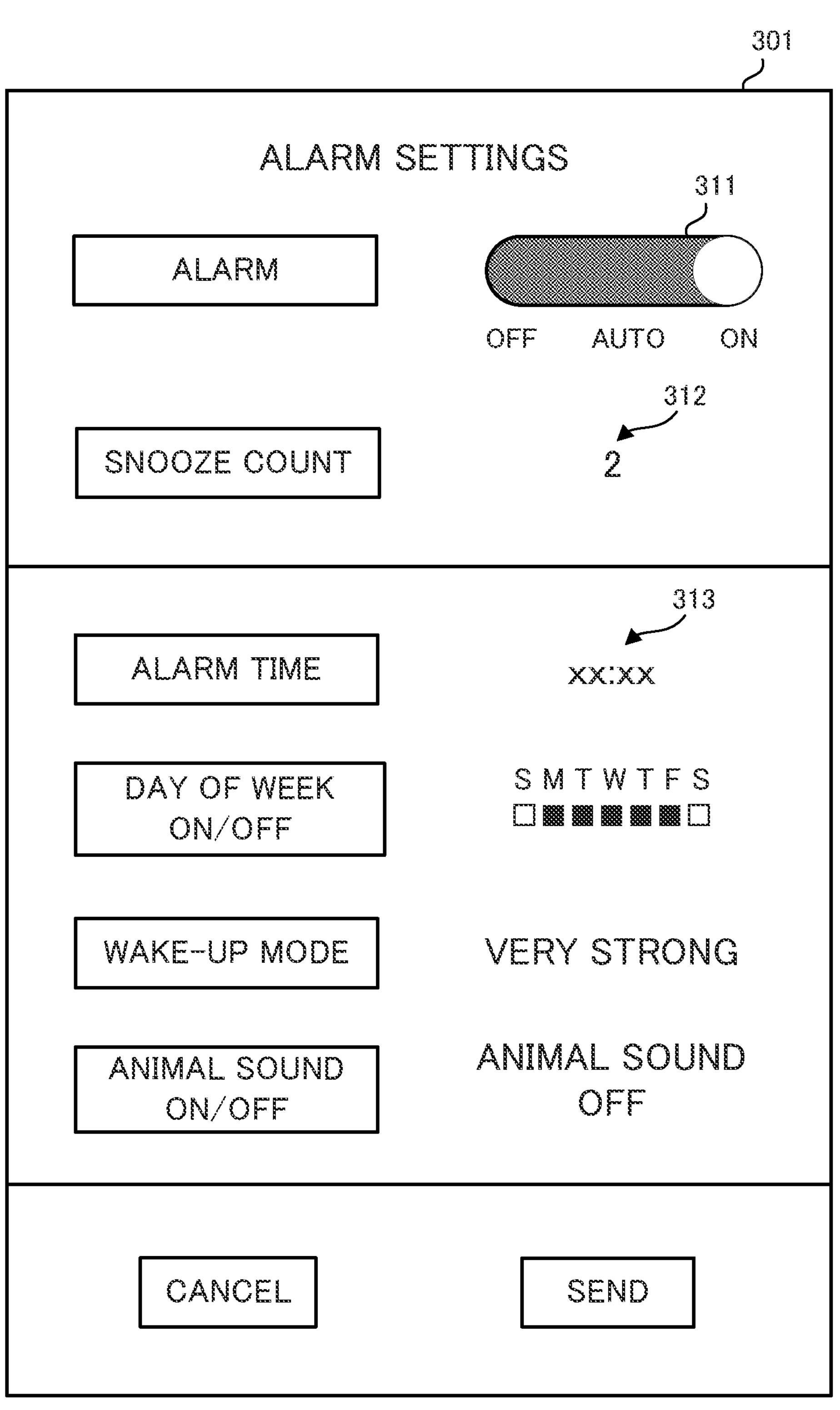

Additionally, a configuration is possible in which the apparatus control device 100 is provided with a conventional, typical alarm function whereby the user sets the alarm time in advance. However, the apparatus control device 100 does not include a display screen and, as such, the setting of the alarm function is performed using an application/program of a smartphone connected via the communicator 130. FIG. 11 illustrates an example of a setting screen 301 of the alarm function of the application/program of the smartphone. When the user desires to set the alarm time themselves, as illustrated in FIG. 11, the user sets a toggle switch 311 of the alarm to ON, and sets an alarm time 313.

In the example illustrated in FIG. 11, the user can, from the setting screen 301 displayed on the smartphone, set the ON/AUTO/OFF toggle switch 311 of the alarm, a snooze count 312 (when 0, snooze is OFF), an alarm time 313, ON/OFF of the alarm for each day of the week, the wake-up mode (intensity of movement of the robot 200 at the time of the alarm, and the like), ON/OFF of the animal sound of the robot 200 at the time of the alarm, and the like. Moreover, from the setting screen 301 displayed on the smartphone, the user can send these settings to the apparatus control device 100 to input the various setting values of the alarm function into the apparatus control device 100.

Figure 12:
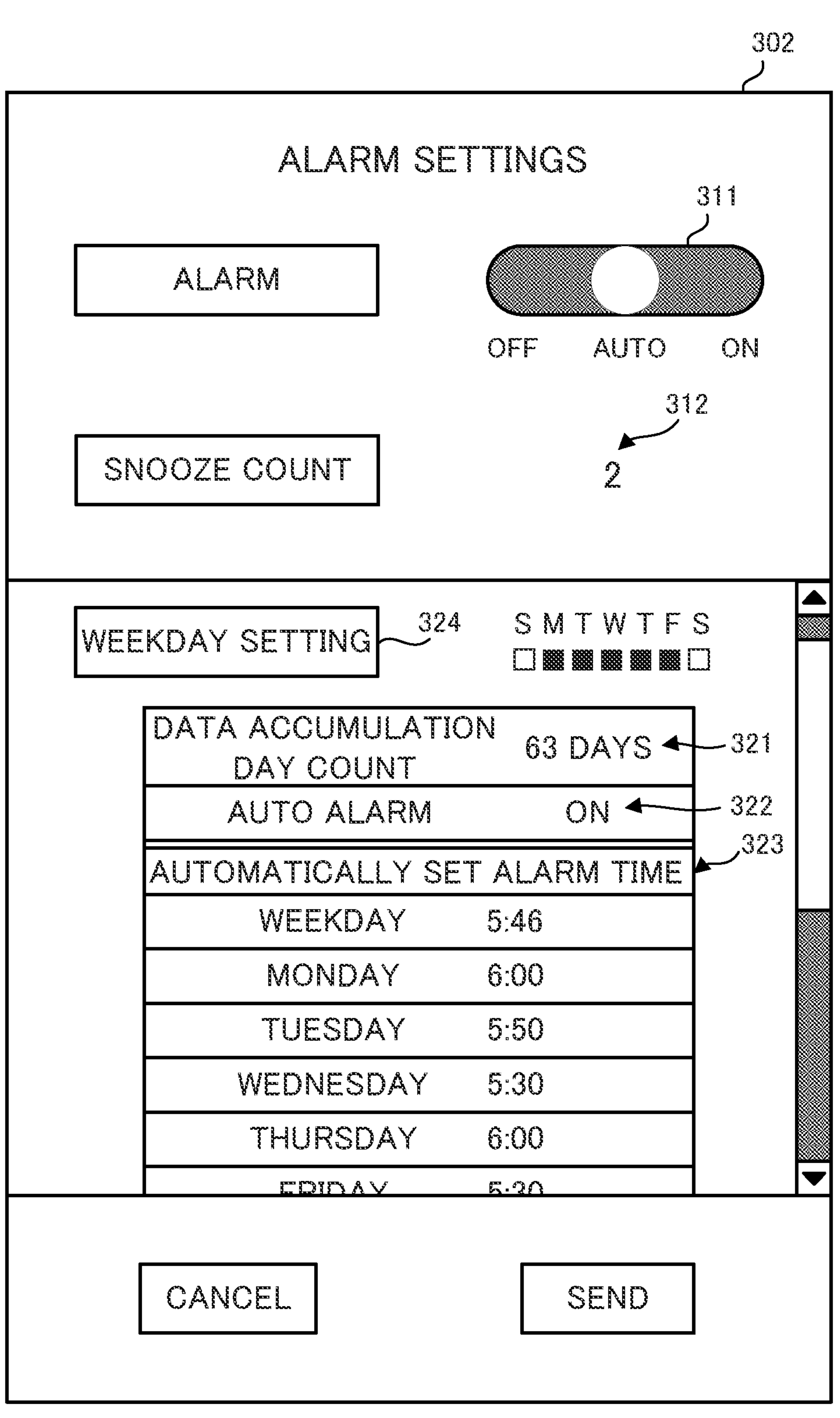
FIG. 12 is a drawing illustrating an example of the alarm setting screen with the alarm is set to AUTO.

Note that FIG. 11 illustrates a setting screen 301 in which the toggle switch 311 of the alarm is set to "ON", but when the toggle switch 311 is set to "AUTO", a setting screen 302 such as illustrated in FIG. 12 is displayed. In this screen, instead of the settings of the alarm time and the like, a data accumulation day count 321 (accumulation day count of the sleep data 122), automatic alarm 322 (indicates whether the automatically set wake-up function is ON; the wake-up function is OFF when the data accumulation day count 321 is less than or equal to the accumulation day count threshold (for example, 30 days), and is ON when the data accumulation day count 321 exceeds the accumulation day count threshold), an automatically set alarm time 323 of each day of the week/holidays (the average wake-up time of the wake-up control data 123), and the like are displayed.

Here, "Weekday 5:46" is set as an automatically set alarm time 323. This "Weekday 5:46" is the average time of all of the wake-up times of the days of the week set by a weekday setting 324 displayed thereabove (in the example of FIG. 12, Monday, Tuesday, Wednesday, Thursday, and Friday), and indicates that these days of the week are grouped and treated as "Weekdays." When nothing is set in the weekday setting 324, each day of the week is treated individually, but. for the days of the week set in the weekday setting 324, the average wake-up times and the like are averaged and treated collectively. As a result, the alarm times of the days of the week grouped in the weekday setting 324 can be made as constant as possible.

While not illustrated in FIG. 12, a configuration is possible in which, as with the weekday setting 324, a plurality of days of the week/holidays (for example, "Saturday, Sunday", and holidays) to be treated collectively as "days off" can be set as a days-off setting.

Figure 13:
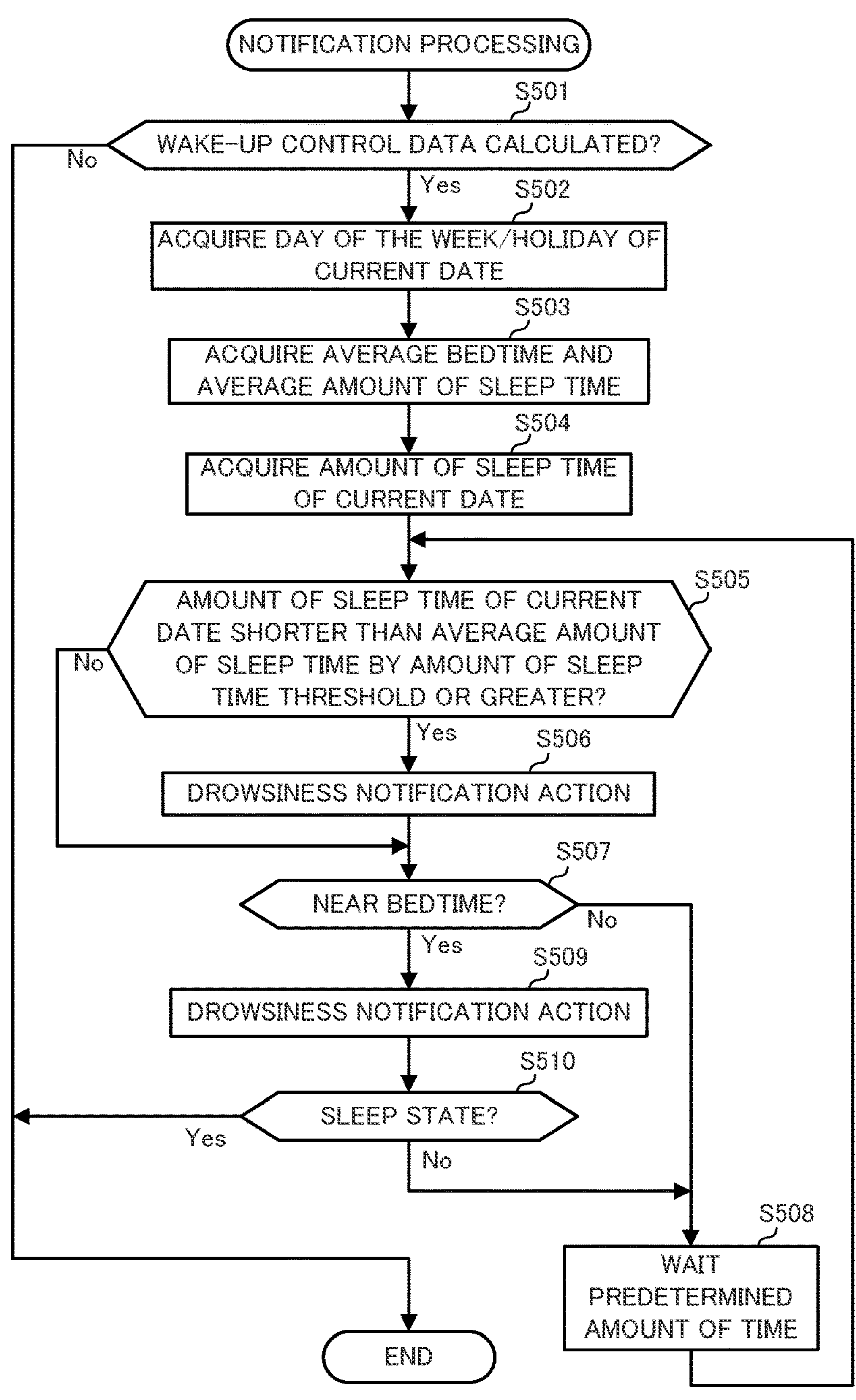
FIG. 13 is a flowchart of notification processing according to the embodiment.

Next, notification processing for notifying, on the basis of the wake-up control data 123, the user in a natural form that the bedtime is near is described while referencing FIG. 13. Every day, execution of a thread of the notification processing starts (is executed in parallel with other threads) when the robot 200 first transitions to the normal state (that is, at the timing at which it is thought that the user wakes up).

Firstly, the processor 110 determines whether the wake-up control data 123 is already calculated (step S501). When the wake-up control data 123 is not calculated (step S501; No), the notification processing is ended.

When the wake-up control data 123 is calculated (step S501; Yes), the processor 110 acquires the day of the week/holiday of the current date (step S502). Then, the processor 110 references the wake-up control data 123, and acquires the average bedtime and the average amount of sleep time of the day of the week/holiday acquired in step S402 (step S503). The acquired average bedtime is a time that serves as a reference for determining the time at which to perform a drowsiness notification action, described later, and, as such, is also called an action reference time. The acquired average amount of sleep time is an amount of time that serves as a reference for determining whether to perform the drowsiness notification action and, as such, is also called a reference amount of sleep time.

Next, the processor 110 references the sleep data 122, acquires the amount of sleep time of the current date (step S504), and determines whether the amount of sleep time of the current date is shorter than the average amount of sleep time by an amount of sleep time threshold (for example, one hour) or greater (step S505). When the amount of sleep time is not shorter by the amount of sleep time threshold or greater (step S505; No), step S507 is executed.

When the amount of sleep time is shorter by the amount of sleep time threshold or greater (step S505; Yes), it is thought that the user is sleep deprived and, as such, the processor 110 causes the robot 200 to execute the drowsiness notification action (step S506). The drowsiness notification action is an action that notifies the user of drowsiness due to being sleep deprived or the bedtime being near. The drowsiness notification action resembles yawning, dozing off, or the like. For example, the processor 110 uses the driver 220 to perform an action resembling yawning (an action of lifting the head 204 up or widely opening a mouth (when the robot 200 can open a mouth)), outputting a sound of yawning from the speaker 231, performing an action resembling dozing off (an action of slowly lifting and lowering the head 204), or the like.

Then, the processor 110 determines whether the bedtime is near (step S507). Specifically, when an amount of time from the current time to the average bedtime is a go-to-bed amount of time threshold (for example, one hour) or less, the processor 110 determines that the bedtime is near. When the bedtime is not near (step S507; No), the processor 110 waits a predetermined amount of time (for example, 30 minutes) (step S508), and returns to step S505.

When the bedtime is near (step S507; Yes), the user will soon become drowsy and, as such, the processor 110 causes the robot 200 to execute the drowsiness notification action (step S509). Then, the processor 110 determines whether the robot 200 is in the sleep state (step S510). When the robot 200 is in the sleep state (step S510; Yes), the processor 110 determines that the robot 200 has transitioned to the sleep state due to the user going to bed, and ends the notification processing.

When the robot 200 is not in the sleep state (step S510; No), the processor 110 executes step S508 and, after waiting the predetermined amount of time, repeats the processing from step S505. Note that the amount of wait time in step S508 when the determination in step S507 is No (the time interval for performing the drowsiness notification action when sleep deprived), and the amount of wait time in step S508 when the determination in step S510 is No (the time interval for performing the drowsiness notification action when the bedtime is near) may be different setting values.

As a result of the notification processing described above, the apparatus control device 100 can notify, by a natural action expected of a pet robot, that the user is sleep deprived, that the bedtime is near, and the like.

Modified Example 1

In the embodiment described above, the wake-up time corresponding to the longest amount of sleep time is the alarm time that is automatically set, but a configuration is possible in which the alarm time is also automatically set to the end time of the shortest amount of sleep time (nap). Hereinafter, Modified Example 1, which is an example in which a nap automatic wake-up function is provided, is described.

The apparatus control device 100 according to Modified Example 1 stores, in the storage 120, nap wake-up control data 124 (for example, data such as illustrated in FIG. 14) calculated by nap wake-up control data calculation processing described later.

As with the wake-up control data calculation processing illustrated in FIG. 9, execution of the nap wake-up control data calculation processing starts every time the processor 110 ends the execution of the sleep data calculation processing. The flow of the nap wake-up control data calculation processing is the same as that of the wake-up control data calculation processing.

However, in steps S302 to S305 of the wake-up control data calculation processing (FIG. 9), the processor 110 calculates the averages of "every day of the week/holiday" but, in the nap wake-up control data calculation processing, instead of "every day of the week/holiday", the processor 110 calculates the average of "every nap group." The term "nap group" refers to data, for which the day of the week and the number of the nap on that day of the week match, is gathered into the same group. For example, the data of the nap group "Tuesday 1" of the nap wake-up control data 124 is data obtained by averaging each of the start time, the end time, and the amount of sleep time of the first naps of Tuesdays.

Moreover, in step S306 of the wake-up control data calculation processing (FIG. 9), the processor 110 stores the calculated average values in the storage 120 as the wake-up control data 123 but, in the nap wake-up control data calculation processing, the processor 110 stores the calculated average values in the storage 120 as the nap wake-up control data 124.

As a result of this nap wake-up control data calculation processing, the nap wake-up control data 124 such as illustrated in FIG. 14, for example, is stored in the storage 120.

Figure 15:
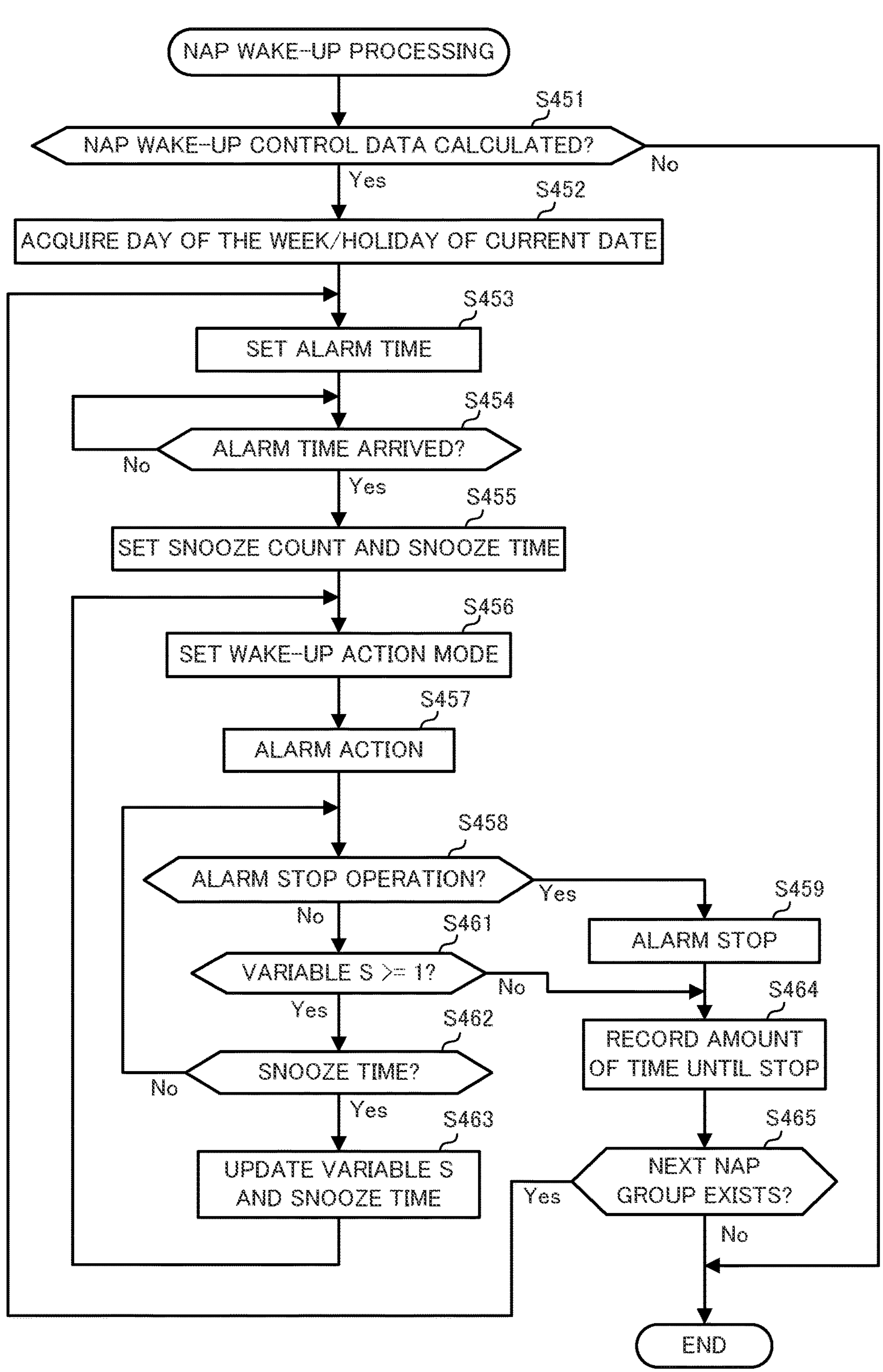
FIG. 15 is a flowchart of nap wake-up processing according to Modified Example 1.

Next, nap wake-up processing, in which a nap alarm time is automatically set on the basis of the nap wake-up control data 124, is described while referencing FIG. 15. As in the wake-up processing described above, execution of a thread of this wake-up processing (execution in parallel with other threads) starts every day at 00:00, that is, when the date changes.

Firstly, the processor 110 determines whether the nap wake-up control data 124 is already calculated (step S451). When the nap wake-up control data 124 is not calculated (step S451; No), the nap wake-up processing is ended.

When the nap wake-up control data 124 is calculated (step S451; Yes), the processor 110 acquires the day of the week/holiday of the current date (step S452). Then, the processor 110 sets the alarm time (step S453). Specifically, the processor 110 references the nap wake-up control data 124 and sets, to the alarm time, the average end time of the first nap group of the day of the week/holiday acquired in step S452.

Since steps S454 to S459 and steps S461 to S463 are the same as steps S404 to S409 and steps S411 to S413 of the wake-up processing (FIG. 10), description thereof is foregone. However, when executing step S456 first, the processor 110 references the nap wake-up control data 124, acquires the average amount of time until stop of the first nap group of the day of the week/holiday acquired in step S452, and sets the wake-up action mode in accordance with the acquired average amount of time until stop.

In step S464, the processor 110 records, in the nap wake-up control data 124 and as the amount of time until stop, the amount of time from the start of the alarm action to when the alarm stop operation by the user is performed. Then, the processor 110 determines whether a next nap group of that date exists in the nap wake-up control data 124 (step S465).

When a next nap group exists (step S465; Yes), the processor 110 returns to step S453 and sets the average end time of the next nap group to the alarm time.

When a next nap group does not exist (step S465; No), the processor 110 ends the nap wake-up processing.

As a result of the nap wake-up processing described above, the apparatus control device 100 according to Modified Example 1 can wake up the user by an appropriate action at the time at which the user must wake up from the nap, without the user setting the alarm time.

Note that a configuration is possible in which the information about the attributes of the dates used in the calculation of the wake-up control data 123 and the nap wake-up control data 124 can be appropriately updated so as to accommodate the establishment of new holidays and the abolition and moving of holidays.

Modified Example 2

A configuration is possible in which, by applying the features described in, for example, Japanese Unexamined Patent Application Publication No 2021-69767, the apparatus control device 100 is provided with pseudo emotions or personalities and, when performing the alarm action, changes the action content of the alarm action on the basis of the pseudo emotion or personality at that time of the apparatus control device 100. For example, when the pseudo emotion is "annoyed", the first amount of time threshold and the second amount of time threshold are made shorter than normal (when the pseudo emotion is "normal"), a comparatively loud animal sound is emitted even in the medium action mode, an extremely loud animal sound is emitted in the large action mode, and the like.

Modified Example 3

Figure 16:
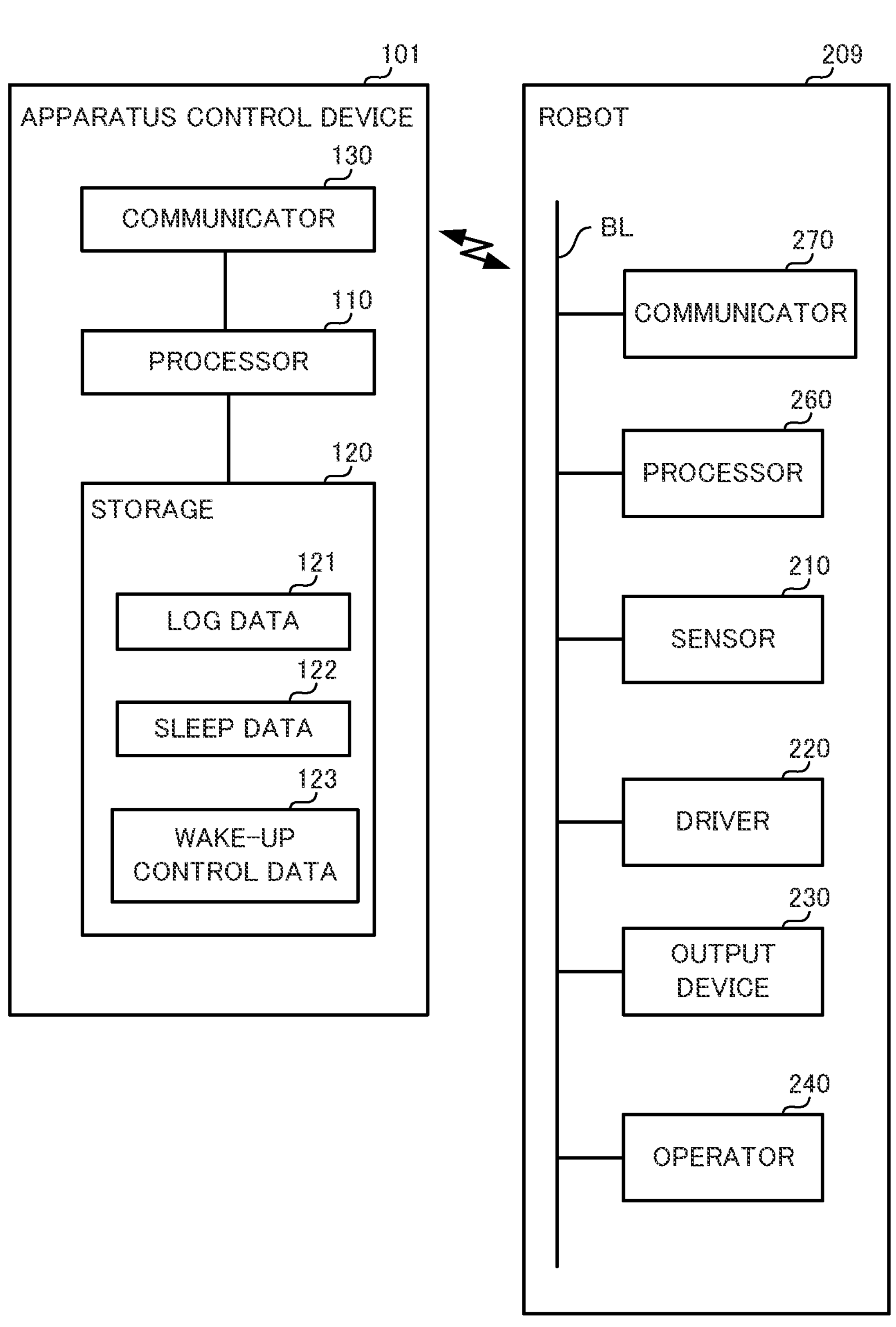
FIG. 16 is a flowchart illustrating the functional configurations of an apparatus control device and a robot according to Modified Example 3.

In the embodiment and the modified examples described above, the apparatus control device 100 is built into the robot 200, but the apparatus control device 100 need not necessarily be built into the robot 200. For example, a configuration is possible in which, as illustrated in FIG. 16, an apparatus control device 101 is not built into a robot 209 and is configured as a separate device (for example, a server). In this modified example, a robot 209 also includes a processor 260 and a communicator 270, and the communicator 130 and the communicator 270 are configured so as to be capable of exchanging data with each other. Moreover, the processor 110 acquires the stimulus detected by the sensor 210, controls the driver 220 and the output device 230, and the like via the communicator 130 and the communicator 270.

Note that, when the apparatus control device 101 and the robot 209 are configured as separate devices in this manner, the robot 209 may, as necessary, be configured to be controlled by the processor 260. For example, simple actions are controlled by the processor 260 and complex actions are controlled by the processor 110 via the communicator 270, or the like.

Modified Example 4

In the embodiment and the modified examples described above, the apparatus control device 100, 101 is a control device having the robot 200, 209 as the apparatus to be controlled. However, the apparatus to be controlled is not limited to a robot, and a wristwatch or the like is possible. For example, a wristwatch including a buzzer as the output device 230, a vibrator as the driver 220, and an acceleration sensor as the sensor 210 can be configured as the apparatus to be controlled. In such a case, the apparatus control device can carry out control for transitioning from the sleep state to the normal state on the basis of acceleration detected, as a stimulus, by the acceleration sensor, and waking the user by the buzzer or the vibrator.

Thus, the apparatus control device 100, 101 is not limited to a robot and can be applied to various apparatuses. Additionally, by applying the apparatus control device 100, 101 to various apparatuses, a wake-up function in which the alarm time is automatically set can be realized in those apparatuses.

Modified Example 5

In the embodiment and the modified examples described above, the processor 110 records information related to the sleeping of the user in the log data 121. However, the information recorded in the log data 121 is not limited to information related to sleeping. A configuration is possible in which, in the daily life of the user with the robot 200, the robot 200 periodically records information detected as stimuli (for example, illuminance and sound when curtains are opened, illuminance and sound when curtains are closed, illuminance and sound in kitchen when water is boiling, and the like) in the log data 121.

In such a case, the times at which the curtains are opened and closed, the time at which the water is boiled, and the like are accumulated in the log data 121 and, by using this log data 121 the apparatus control device 100 can issue messages to the user such as "are you going to open the curtains today", "it is time to close the curtains", "you boiled water earlier than usual today", and the like. As such, when the user forgets a time related to a behavior habitually performed by the user, the robot 200 can inform the user of that behavior, and this leads to the prevention of forgetfulness and careless mistakes.

Advantageous Effects

As described above, the processor 110 sets the action time on the basis of the data related to the sleeping of the user. As such, the user does not need to set the action time in advance, and the apparatus can be caused to perform an action at an appropriate time.

The processor 110 estimates the bedtime and the wake-up time of the user. As such, the wake-up action can be executed at an appropriate time without the user setting the wake-up time in advance.

The processor 110 sets the action time on the basis of the representative value of the wake-up times for which the attributes of the dates are the same. As such, the wake-up action can be executed at an appropriate time in correspondence with changes in the wake-up time of the user on every day of the week.

The processor 110 changes the content of the wake-up action on the basis of the amount of time required for the user to stop a past wake-up action. As such, when it is expected that the user will wake up immediately, the user can be woken up with a small stimulus and, conversely, when it is expected that the user will not readily wake up, the user can be woken up with a large stimulus.

The processor 110 sets an action reference time on the basis of the representative value of the bedtimes for which the attributes of the dates are the same. As such, the drowsiness notification action can be executed at an appropriate time in correspondence with changes in the bedtime of the user on every day of the week. As such, the apparatus control device 100, 101 can naturally inform the user that bedtime is near by causing the robot 200, 209 to perform a yawn or the like.

When the processor 110 compares the average amount of sleep time and the amount of sleep time of the current date and determines that the user is sleep deprived, the processor 110 can execute the drowsiness notification action. As such, the apparatus control device 100, 101 can naturally inform the user that the user is sleep deprived today and should take a nap by causing the robot 200, 209 to perform a yawn or the like.

In the embodiment described above, the action programs executed by the CPU of the processor 110 are stored in advance in the ROM or the like of the storage 120. However, the present disclosure is not limited thereto, and a configuration is possible in which the action programs for executing the various processings described above are installed on an existing general-purpose computer or the like, thereby causing that computer to function as a device corresponding to the apparatus control device 100, 101 according to the embodiment described above.

Any method can be used to provide such programs. For example, the programs may be stored and distributed on a non-transitory computer-readable recording medium (flexible disc, Compact Disc (CD)-ROM, Digital Versatile Disc (DVD)-ROM, Magneto Optical (MO) disc, memory card, USB memory, or the like), or may be provided by storing the programs in a storage on a network such as the internet, and causing these programs to be downloaded.

Additionally, in cases in which the processings described above are realized by being divided between an operating system (OS) and an application/program, or are realized by cooperation between an OS and an application/program, it is possible to store only the portion of the application/program on the non-transitory recording medium or in the storage. Additionally, the programs can be piggybacked on carrier waves and distributed via a network. For example, the programs may be posted to a bulletin board system (BBS) on a network, and distributed via the network. Moreover, a configuration is possible in which the processings described above are executed by starting these programs and, under the control of the operating system (OS), executing the programs in the same manner as other applications/programs.

Additionally, a configuration is possible in which the processor 110, 260 is constituted by a desired processor unit such as a single processor, a multiprocessor, a multi-core processor, or the like, or by combining these desired processors with processing circuitry such as an application specific integrated circuit (ASIC), a field-programmable gate array (FPGA), or the like.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The invention claimed is:

1. An apparatus control device comprising:

a processor configured to acquire stimulus data representing an external stimulus acting on an apparatus that is controlled by the apparatus control device; and a storage configured to store the stimulus data;

wherein the processor is configured to:

accumulate, in the storage, a plurality of items of the stimulus data acquired in time-series over a plurality of dates, each of the plurality of items of the stimulus data including time information on a date and time at which the external stimulus represented by the item of stimulus data occurred;

analyze the stored plurality of items of the stimulus data to determine a time pattern of a habitual behavior of a user of the apparatus, the habitual behavior being a behavior that the user performs with regularity over multiple dates among the plurality of dates, and the habitual behavior including sleeping by the user;

set an action time related to the habitual behavior of the user, based on the determined time pattern, the action time being a time at which the apparatus executes an action related to the habitual behavior of the user, and the action time including a wake-up time of the user when the user wakes from sleep;

store, for each of the plurality of dates, the wake-up time of the user in association with the corresponding date, each date having a date attribute;

set, as the action time for each date attribute, a representative value of the wake-up times stored in association with dates having the same date attribute; and control the apparatus to execute, as the action related to the habitual behavior of the user, a wake-up action at the action time set for the date attribute of a current date.

2. The apparatus control device according to claim 1, wherein the processor:

stores, in association with the action time, an amount of time until stop that is an amount of time from when the apparatus is caused to execute the wake-up action to when the user stops the wake-up action, and changes, based on the amount of time until stop, a content of the wake-up action performed when causing the apparatus to execute the wake-up action.

3. The apparatus control device according to claim 1, wherein when the user does not stop the wake-up action even though an amount of wake-up duration time exceeds an amount of time threshold, the processor changes, based on the amount of wake-up duration time, a content of the wake-up action that the apparatus is being caused to execute, the amount of wake-up duration time being an amount of time after the apparatus is caused to execute the wake-up action.

4. The apparatus control device according to claim 1, wherein:

the action time includes a bedtime of the user when the user goes to sleep, and the processor:

stores, for each of the plurality of dates, the bedtime in association with the corresponding date, each date having a date attribute, sets an action reference time for each date attribute, the action reference time being a reference for determining the action time of that date attribute, and the processor setting, as the action reference time for each of the date attributes, a representative value of the bedtimes stored in association with dates having that same date attribute, and causes the apparatus to execute a drowsiness notification action when an amount of time from a current time to the action reference time set for the date attribute of a current date is less than or equal to a go-to-bed amount of time threshold.

5. The apparatus control device according to claim 1, wherein:

the action time includes a bedtime of the user when the user goes to sleep, and the processor:

acquires, based on the bedtime and the wake-up time of the user, an amount of sleep time of the user, and stores, for each of the plurality of dates, the amount of sleep time in association with the corresponding date, sets a reference amount of sleep time for each date attribute, wherein the processor sets, as the reference amount of sleep time for each of the date attributes, a representative value of the amounts of sleep time stored in association with dates having that same date attribute, acquires the amount of sleep time for the current date, and causes the apparatus to execute a drowsiness notification action when the acquired amount of sleep time for the current date is shorter than the reference amount of sleep time set for the date attribute of the current date by an amount of sleep time threshold or greater.

6. The apparatus control device according to claim 1, wherein the processor:

acquires, as the stimulus data, acceleration information that is information about acceleration acting on the apparatus, and sets the action time based on the acceleration information.

7. The apparatus control device according to claim 6, wherein the acceleration information includes acceleration data acquired as a result of the user contacting the apparatus.

8. The apparatus control device according to claim 1, wherein the processor:

acquires, as the stimulus data, illuminance information that is information about illuminance around the apparatus, and sets the action time based on the illuminance information.

9. The apparatus control device according to claim 8, wherein the illuminance information includes illuminance information of lighting or sunlight in an environment in which the apparatus is placed.

10. The apparatus control device according to claim 1, wherein when a current time becomes the set action time, the processor informs the user of the habitual behavior that the user habitually performs by causing an operating part of the apparatus to operate to change an orientation of a movable portion of the apparatus.

11. The apparatus control device according to claim 1, wherein when a current time becomes the set action time, the processor informs the user of the habitual behavior that the user habitually performs by causing a sound outputter of the apparatus to operate and output a predetermined sound.

12. An apparatus control method executed by a processor of an apparatus control device that controls an apparatus, the method comprising:

acquiring stimulus data representing an external stimulus acting on the apparatus;

accumulating, in a storage, a plurality of items of the stimulus data acquired in time-series over a plurality of dates, each of the plurality of items of the stimulus data including time information on a date and time at which the external stimulus represented by the item of stimulus data occurred;

analyzing the stored plurality of items of stimulus data to determine a time pattern of a habitual behavior of a user of the apparatus, the habitual behavior being a behavior that the user performs with regularity over multiple dates among the plurality of dates, and the habitual behavior including sleeping by the user;

setting an action time related to the habitual behavior of the user, the action time being a time at which the apparatus executes an action related to the habitual behavior of the user, and the action time including a wake-up time of the user when the user wakes from sleep;

storing, for each of the plurality of dates, the wake-up time of the user in association with the corresponding date, each date having a date attribute;

setting, as the action time for each date attribute, a representative value of the wake-up times stored in association with dates having that same date attribute; and controlling the apparatus to execute, as the action related to the habitual behavior of the user, a wake-up action at the action time set for the date attribute of a current date.

13. A non-transitory computer-readable recording medium storing a program that is executable by a computer to cause the computer to perform processing comprising:

acquiring stimulus data representing an external stimulus acting on an apparatus that is controlled by the computer;

accumulating, in a storage, a plurality of items of the stimulus data acquired in time-series over a plurality of dates, each of the plurality of items of the stimulus data including time information on a date and time at which the external stimulus represented by the item of stimulus data occurred;

analyzing the stored plurality of items of stimulus data to determine a time pattern of a habitual behavior of a user of the apparatus, the habitual behavior being a behavior that the user performs with regularity over multiple dates among the plurality of dates, and the habitual behavior including sleeping by the user;

setting an action time related to the habitual behavior of the user, the action time being a time at which the apparatus executes an action related to the habitual behavior of the user, and the action time including a wake-up time of the user when the user wakes from sleep;

storing, for each of the plurality of dates, the wake-up time of the user in association with the corresponding date, each date having a date attribute;

setting, as the action time for each date attribute, a representative value of the wake-up times stored in association with dates having that same date attribute; and controlling the apparatus to execute, as the action related to the habitual behavior of the user, a wake-up action at the action time set for the date attribute of a current date.

* * * * *